(12) United States Patent
Duan et al.

(10) Patent No.: US 12,388,585 B2
(45) Date of Patent: Aug. 12, 2025

(54) HIGH-GRANULARITY PRECODER CYCLING WITH CHANNEL ESTIMATION

(71) Applicant: QUALCOMM Incorporated, San Diego, CA (US)

(72) Inventors: Weimin Duan, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 18/514,910

(22) Filed: Nov. 20, 2023

(65) Prior Publication Data

US 2025/0167939 A1    May 22, 2025

(51) Int. Cl.
*H04L 5/00* (2006.01)
*H04B 7/0456* (2017.01)
*H04L 25/02* (2006.01)

(52) U.S. Cl.
CPC ......... *H04L 5/0023* (2013.01); *H04B 7/0456* (2013.01); *H04L 25/0224* (2013.01)

(58) Field of Classification Search
CPC ... H04L 5/0048; H04L 5/0053; H04L 5/0051; H04L 5/0023; H04L 5/0007; H04L 5/0094; H04L 5/0044; H04L 5/0091; H04W 72/23; H04W 72/0446; H04W 4/40; H04W 72/044; H04W 72/0453; H04W 72/51; H04W 72/20; H04W 76/14; H04B 7/0456; H04B 7/0626; H04B 7/0639; H04B 7/0617; H04B 7/0486; H04B 7/0478; H04B 7/0413; H04B 7/0632

See application file for complete search history.

(56) References Cited

U.S. PATENT DOCUMENTS

| | | | |
|---|---|---|---|
| 9,667,378 B2 * | 5/2017 | Jöngren | H04B 7/0417 |
| 2012/0207243 A1 * | 8/2012 | Koivisto | H04B 7/0469 |
| | | | 375/296 |
| 2018/0337757 A1 * | 11/2018 | Noh | H04L 27/26 |
| 2019/0182807 A1 * | 6/2019 | Panteleev | H04L 5/0048 |
| 2020/0052842 A1 * | 2/2020 | Rico Alvarino | H04L 5/005 |
| 2021/0306182 A1 * | 9/2021 | Kim | H04L 5/0048 |
| 2025/0097680 A1 * | 3/2025 | Lee | G01S 5/08 |

* cited by examiner

*Primary Examiner* — Eva Y Puente
(74) *Attorney, Agent, or Firm* — Holland & Hart LLP/Qualcomm Incorporated

(57) ABSTRACT

Methods, systems, and devices for wireless communication are described. First representations of a first symbol of a space-frequency block coded symbol pair using first resources of a set of resources and first representations of a second symbol of the space-frequency block coded symbol pair using second resources of the set of resources may be transmitted via a first beam. The set of resources may be a set of time and frequency resources. Second representations of the first symbol using the second resources and second representations of the second symbol using the first resources of the plurality of resources may be transmitted via a second beam. In some examples, across the set of resources, the first beam, and the second beam, each representation of the first symbol and each representation of the second symbol is precoded by a different respective precoder of a set of precoders.

30 Claims, 16 Drawing Sheets

HIGH-GRANULARITY PRECODER CYCLING WITH CHANNEL ESTIMATION

FIELD OF TECHNOLOGY

The following relates to wireless communication, including high-granularity precoder cycling with channel estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Multiple-input, multiple-output (MIMO) communications may exploit multipath propagation to improve a throughput, reliability, or both of communications. In some examples, MIMO communications may employ precoding techniques to further exploit multipath propagation, such as precoder cycling. In some examples, MIMO communications may be performed in a closed-loop, open-loop, or semi-open-loop manner.

SUMMARY

The described techniques relate to improved methods, systems, devices, and apparatuses that support high-granularity precoder cycling with channel estimation. In some examples, to support precoder cycling with increased-efficiency resource block allocation and with reduced effect on channel estimation, spatial frequency block coding and cyclic delay diversity may be used together with non-transparent precoder cycling (e.g., to receive resource element or resource block level cycling) and a demodulation reference signal (DMRS) bundling size may be maintained (e.g., to maintain channel estimation performance). In some examples, spatial frequency block coding and cyclic delay diversity may be complementary to one another—e.g., when more than two antenna ports are used. For instance, combined spatial frequency block coding and cyclic delay diversity scheme may be beneficial when a multiple panel base station with cross polarization is used—e.g., to provide full diversity between different polarizations and panels.

A method for wireless communications by a wireless device is described. The method may include transmitting, via a first beam, first representations of a first symbol of a space-frequency block coded symbol pair using first resources of a set of multiple resources and first representations of a second symbol of the space-frequency block coded symbol pair using second resources of the set of multiple resources, where the set of multiple resources are a set of multiple time and frequency resources and transmitting, via a second beam, second representations of the first symbol using the second resources and second representations of the second symbol using the first resources of the set of multiple resources, where across the set of multiple resources, the first beam, and the second beam, each representation of the first symbol and each representation of the second symbol is precoded by a different respective precoder of a set of multiple precoders.

An apparatus for wireless communications is described. The apparatus may include a memory and at least one processor of a network entity, the at least one processor coupled with the memory. The at least one processor may be configured to transmit, via a first beam, first representations of a first symbol of a space-frequency block coded symbol pair using first resources of a set of multiple resources and first representations of a second symbol of the space-frequency block coded symbol pair using second resources of the set of multiple resources, where the set of multiple resources are a set of multiple time and frequency resources and transmit, via a second beam, second representations of the first symbol using the second resources and second representations of the second symbol using the first resources of the set of multiple resources, where across the set of multiple resources, the first beam, and the second beam, each representation of the first symbol and each representation of the second symbol is precoded by a different respective precoder of a set of multiple precoders.

Another apparatus for wireless communications is described. The apparatus may include means for transmitting, via a first beam, first representations of a first symbol of a space-frequency block coded symbol pair using first resources of a set of multiple resources and first representations of a second symbol of the space-frequency block coded symbol pair using second resources of the set of multiple resources, where the set of multiple resources are a set of multiple time and frequency resources and means for transmitting, via a second beam, second representations of the first symbol using the second resources and second representations of the second symbol using the first resources of the set of multiple resources, where across the set of multiple resources, the first beam, and the second beam, each representation of the first symbol and each representation of the second symbol is precoded by a different respective precoder of a set of multiple precoders.

A non-transitory computer-readable medium storing code for wireless communications is described. The code may include instructions executable by a processor to transmit, via a first beam, first representations of a first symbol of a space-frequency block coded symbol pair using first resources of a set of multiple resources and first representations of a second symbol of the space-frequency block coded symbol pair using second resources of the set of multiple resources, where the set of multiple resources are a set of multiple time and frequency resources and transmit, via a second beam, second representations of the first symbol using the second resources and second representations of the second symbol using the first resources of the set of multiple resources, where across the set of multiple resources, the first beam, and the second beam, each representation of the first symbol and each representation of the second symbol is precoded by a different respective precoder of a set of multiple precoders.

Some examples of the method, wireless devices, and non-transitory computer-readable medium described herein may further include operations, features, means, or instructions for signaling, to a second wireless device, an indication of a correspondence between each precoder of the set of multiple precoders and each resource of the set of multiple resources.

Some examples of the method, wireless devices, and non-transitory computer-readable medium described herein may further include operations, features, means, or instructions for mapping the first representations of the first symbol to the first resources and the second representations of the first symbol to the second resources, applying, based on the mapping, a first set of precoders of the set of multiple precoders to the first resources, where the first set of precoders may be used for transmissions via the first beam, and where respective phases of the first set of precoders may be offset from one another, and applying, based on the mapping, a second set of precoders of the set of multiple precoders to the second resources, where the second set of precoders may be used for transmissions via the second beam, and where respective phases of the second set of precoders may be offset from one another.

Some examples of the method, wireless devices, and non-transitory computer-readable medium described herein may further include operations, features, means, or instructions for cycling a phase of a first precoder to obtain a first set of multiple cycled precoders, where the first set of precoders includes the first set of multiple cycled precoders and cycling a phase of a second precoder to obtain a second set of multiple cycled precoders, where the second set of precoders includes the second set of multiple cycled precoders.

Some examples of the method, wireless devices, and non-transitory computer-readable medium described herein may further include operations, features, means, or instructions for transmitting, via the first beam, a first set of multiple demodulation reference signals using a second set of multiple resources, where a bandwidth of the second plurality of resources may be larger than a bandwidth of the first set of multiple resources and transmitting, via the second beam, a second set of multiple demodulation reference signals using a third set of multiple resources, where a bandwidth of the third set of multiple resources may be larger than the bandwidth of the first set of multiple resources.

In some examples of the method, wireless devices, and non-transitory computer-readable medium described herein, a first demodulation reference signal of the first set of multiple demodulation reference signals may be transmitted via a first demodulation reference signal port that corresponds to the first beam and a first polarization, a second demodulation reference signal of the first set of multiple demodulation reference signals may be transmitted via a second demodulation reference signal port that corresponds to the first beam and a second polarization, a first demodulation reference signal of the second set of multiple demodulation reference signals may be transmitted via a third demodulation reference signal port that corresponds to the second beam and the first polarization, and a second demodulation reference signal of the second set of multiple demodulation reference signals may be transmitted via a fourth demodulation reference signal port that corresponds to the second beam and the second polarization.

In some examples of the method, wireless devices, and non-transitory computer-readable medium described herein, the first demodulation reference signal of the first set of multiple demodulation reference signals and the first demodulation reference signal of the second set of multiple demodulation reference signals may be associated with an estimate of a first polarized component of a channel between the network entity and a second wireless device, and the second demodulation reference signal of the first set of multiple demodulation reference signals and the second demodulation reference signal of the second set of multiple demodulation reference signals may be associated with an estimate of a second polarized component of the channel.

In some examples of the method, wireless devices, and non-transitory computer-readable medium described herein, a multiple-input, multiple-output signal may be transmitted from the network entity to a second wireless device based on transmitting the first representations of the first symbol, the first representations of the second symbol, the second representations of the first symbol, and the second representations of the second symbol, and the first representations of the first symbol, the second representations of the first symbol, the first representations of the second symbol, and the second representations of the second symbol enable diversity combining of the first symbol and the second symbol at the second wireless device.

In some examples of the method, wireless devices, and non-transitory computer-readable medium described herein, a first antenna panel of the network entity includes a first set of antennas and may be associated with a first set of antenna ports, and a second antenna panel of the network entity includes a second set of antennas and may be associated with a second set of antenna ports.

Some examples of the method, wireless devices, and non-transitory computer-readable medium described herein may further include operations, features, means, or instructions for encoding a stream of data symbols using a spatial frequency block coding scheme to obtain a stream of space-frequency block coded symbol pairs including the space-frequency block coded symbol pair that includes the first symbol and the second symbol and mapping, based on the encoding, a first representation of the first symbol to each resource of the first resources and a first representation of the second symbol to each resource of the second resources, and a second representation of the first symbol to each resource of the second resources and a second representation of the second symbol to each resource of the first resources, where the first representations of the first symbol, the second representations of the first symbol, the first representations of the second symbol, and the second representations of the second symbol may be transmitted based on the mapping.

In some examples of the method, wireless devices, and non-transitory computer-readable medium described herein, across the first beam and the second beam, each representation of the first symbol may be conveyed via a respective resource of the set of multiple resources, across the first beam and the second beam, each representation of the second symbol may be conveyed via a respective resource of the set of multiple resources, and each resource of the set of multiple resources may be a resource element or a resource block.

A method for wireless communications by a wireless device is described. The method may include receiving first representations of a first symbol of a space-frequency block coded symbol pair using first resources of a set of multiple resources and first representations of a second symbol of the space-frequency block coded symbol pair using second resources of the set of multiple resources, the first representations of the first symbol and the first representations of the second symbol being transmitted via a first beam, where the set of multiple resources are a set of multiple time and frequency resources and receiving second representations of the first symbol using the second resources and second representations of the second symbol using the first resources of the set of multiple resources, the second representations of the first symbol and the second representations of the second symbol being transmitted via a second beam, where across the set of multiple resources, the first beam, and the second beam, each representation of the first symbol and each representation of the second symbol is precoded by a different respective precoder of a set of multiple precoders.

An apparatus for wireless communications is described. The apparatus may include a memory, a transceiver, and at least one processor of a user equipment, the at least one processor coupled with the memory and the transceiver. The at least one processor may be configured to receive first representations of a first symbol of a space-frequency block coded symbol pair using first resources of a set of multiple resources and first representations of a second symbol of the space-frequency block coded symbol pair using second resources of the set of multiple resources, the first representations of the first symbol and the first representations of the second symbol being transmitted via a first beam, where the set of multiple resources are a set of multiple time and frequency resources and receive second representations of the first symbol using the second resources and second representations of the second symbol using the first resources of the set of multiple resources, the second representations of the first symbol and the second representations of the second symbol being transmitted via a second beam, where across the set of multiple resources, the first beam, and the second beam, each representation of the first symbol and each representation of the second symbol is precoded by a different respective precoder of a set of multiple precoders.

Another apparatus for wireless communications is described. The apparatus may include means for receiving first representations of a first symbol of a space-frequency block coded symbol pair using first resources of a set of multiple resources and first representations of a second symbol of the space-frequency block coded symbol pair using second resources of the set of multiple resources, the first representations of the first symbol and the first representations of the second symbol being transmitted via a first beam, where the set of multiple resources are a set of multiple time and frequency resources and means for receiving second representations of the first symbol using the second resources and second representations of the second symbol using the first resources of the set of multiple resources, the second representations of the first symbol and the second representations of the second symbol being transmitted via a second beam, where across the set of multiple resources, the first beam, and the second beam, each representation of the first symbol and each representation of the second symbol is precoded by a different respective precoder of a set of multiple precoders.

A non-transitory computer-readable medium storing code for wireless communications is described. The code may include instructions executable by a processor to receive first representations of a first symbol of a space-frequency block coded symbol pair using first resources of a set of multiple resources and first representations of a second symbol of the space-frequency block coded symbol pair using second resources of the set of multiple resources, the first representations of the first symbol and the first representations of the second symbol being transmitted via a first beam, where the set of multiple resources are a set of multiple time and frequency resources and receive second representations of the first symbol using the second resources and second representations of the second symbol using the first resources of the set of multiple resources, the second representations of the first symbol and the second representations of the second symbol being transmitted via a second beam, where across the set of multiple resources, the first beam, and the second beam, each representation of the first symbol and each representation of the second symbol is precoded by a different respective precoder of a set of multiple precoders.

Some examples of the method, wireless devices, and non-transitory computer-readable medium described herein may further include operations, features, means, or instructions for receiving an indication of a correspondence between each precoder of the set of multiple precoders and each resource of the set of multiple resources.

Some examples of the method, wireless devices, and non-transitory computer-readable medium described herein may further include operations, features, means, or instructions for receiving a first set of multiple demodulation reference signals using a second set of multiple resources, the first set of multiple demodulation reference signals being transmitted via the first beam, where a bandwidth of the second plurality of resources may be larger than a bandwidth of the first set of multiple resources and receiving a second set of multiple demodulation reference signals using the second set of multiple resources or a third set of multiple resources, the second set of multiple demodulation reference signals being transmitted via the second beam, where a bandwidth of the third set of multiple resources may be larger than the bandwidth of the first set of multiple resources.

In some examples of the method, wireless devices, and non-transitory computer-readable medium described herein, a first demodulation reference signal of the first set of multiple demodulation reference signals may be associated with a first demodulation reference signal port that corresponds to the first beam and a first polarization, a second demodulation reference signal of the first set of multiple demodulation reference signals may be associated with a second demodulation reference signal port that corresponds to the first beam and a second polarization, a first demodulation reference signal of the second set of multiple demodulation reference signals may be associated with a third demodulation reference signal port that corresponds to the second beam and the first polarization, and a second demodulation reference signal of the second set of multiple demodulation reference signals may be associated with a fourth demodulation reference signal port that corresponds to the second beam and the second polarization.

Some examples of the method, wireless devices, and non-transitory computer-readable medium described herein may further include operations, features, means, or instructions for estimating, based on the first demodulation reference signal of the first set of multiple demodulation reference signals and the first demodulation reference signal of the second set of multiple demodulation reference signals, a first polarized component of a channel between the UE and a second wireless device and estimating, based on the second demodulation reference signal of the first set of multiple demodulation reference signals and the second demodulation reference signal of the second set of multiple demodulation reference signals, a second polarized component of the channel.

Some examples of the method, wireless devices, and non-transitory computer-readable medium described herein may further include operations, features, means, or instructions for receiving a multiple-input, multiple-output signal based on receiving the first representations of the first symbol, the first representations of the second symbol, the second representations of the first symbol, and the second representations of the second symbol, combining a set of multiple instances of the first symbol received in the multiple-input, multiple-output signal to obtain a diversity-combined first symbol, and combining a set of multiple instances of the second symbol received in the multiple-input, multiple-output signal to obtain a diversity-combined second symbol.

DETAILED DESCRIPTION

Multiple input, multiple output (MIMO) communications may be performed in a closed-loop, open-loop, or semi-open-loop manner. Closed-loop MIMO may be associated with a larger amount of signaling overhead than open-loop and semi-open loop MIMO and a performance of closed-loop MIMO may be affected by signaling delays, processing delays, or both. Open-loop MIMO and semi-open-loop MIMO may use a larger amount of resources than closed-loop MIMO, may suffer from reduced channel estimation performance, or both. In massive MIMO systems, devices (e.g., network entities) may use very large quantities (relative to standard MIMO systems) of antenna components (e.g., antenna elements, antennas panels, antennas ports, or any combination thereof)—e.g., to improve spectral and energy efficiency for wireless communications.

However, the problems associated with closed-loop MIMO, open-loop MIMO, and semi-open-loop MIMO may be exacerbated as the quantity of antenna components are increased. For example, a signaling overhead may be increased for closed-loop MIMO to support additional propagation paths. In other examples, a quantity of resources allocated to open-loop MIMO and semi-open-loop MIMO may increase—e.g., to take advantage of the additional diversity provided by the additional propagation paths, and the like. Thus, mechanisms (e.g., methods, systems, apparatuses, techniques, configurations, components) that support precoder cycling with increased-efficiency resource block allocation (e.g., resource block-level or resource-element level cycling) with reduced (e.g., without) effect on channel estimation may be desired.

To support precoder cycling with increased-efficiency resource block allocation and with reduced effect on channel estimation, spatial frequency block coding and cyclic delay diversity may be used together with non-transparent precoder cycling (e.g., to receive resource element or resource block level cycling) and a DMRS bundling size may be maintained (e.g., to maintain channel estimation performance). In some examples, spatial frequency block coding and cyclic delay diversity may be complementary to one another—e.g., when more than two antenna ports are used. For instance, combined spatial frequency block coding and cyclic delay diversity scheme may be beneficial when a multiple panel network entity with cross polarization is used—e.g., to provide full diversity between different polarizations and panels.

Figure 1:
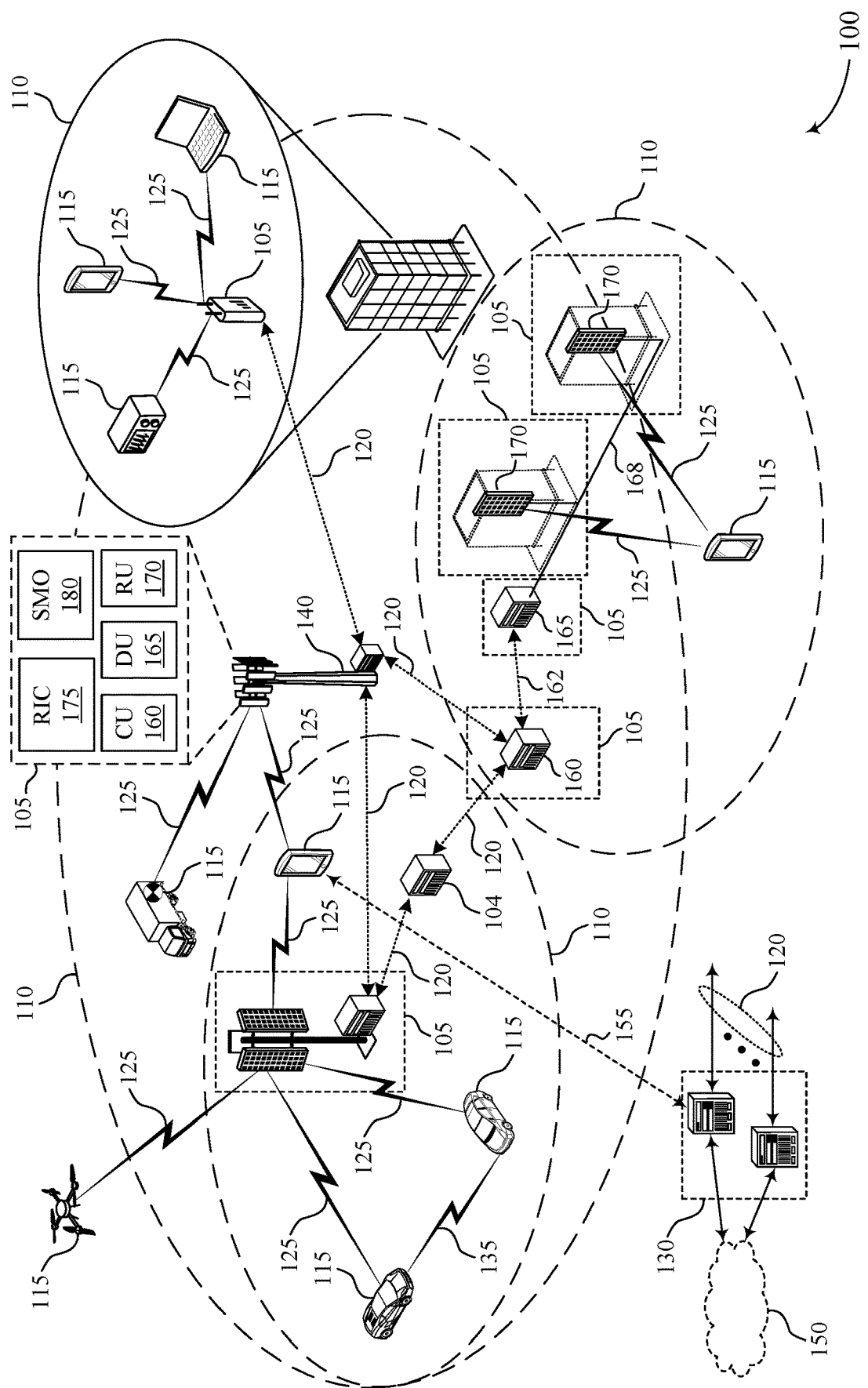
FIG. 1 shows an example of a wireless communications system that supports high-granularity precoder cycling with channel estimation in accordance with one or more aspects of the present disclosure.

FIG. 1 shows an example of a wireless communications system 100 that supports high-granularity precoder cycling with channel estimation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support high-granularity precoder cycling with channel estimation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

As described herein MIMO communications may using multiple transmission and receiving antennas to exploit multipath propagation. More particularly, MIMO communications may use multiple transmission and receiving antennas (of one or more devices) to convey multiple data streams across multiple spatial paths that exists between the transmitting and receiving antennas.

Precoding may be used to increase a signal level of a multiple stream (or multiple layer) transmission that is received at multiple receiving antennas (e.g., at a single or multiple devices)—e.g., may increase (or, in some examples, maximize) the signal level at each of the multiple receiving antennas. Increasing the signal level may involve applying respective weights to multiple information streams prior to transmission over multiple transmitters.

MIMO communications may be performed in a closed-loop, open-loop, or semi-open-loop manner. Closed-loop MIMO communications may include configuring one or more precoding matrices based on channel state information (e.g., which may include channel quality indicator (CQI), a rank indicator (RI), a precoding matrix indicator (PMI), etc.) reported by one or more receiving devices. Closed-loop MIMO communications may exhibit enhanced performance relative to open-loop communications or semi-open-loop communications—e.g., when accurate CSI feedback is available at the transmitting device. However, an overhead (e.g., a signaling and resource overhead) of closed-loop MIMO communications may be greater than overhead associated with open-loop MIMO communications. Additionally, a performance of closed-loop communication may be reduced as a result of processing delays, reporting delays, or both.

Open-loop MIMO communications may reduce (e.g., eliminate) the signaling overhead associated with closed-loop MIMO communications. In some examples, resource block group-level precoder cycling may be used to support open-loop MIMO communications. Resource block group-level precoder cycling may involve changing the precoder from one set of resource blocks to the next. In some examples, the precoder used for a set of resource blocks may be kept constant. The resource block group-level precoder cycling may be transparent to receiving devices, such that the precoder cycling used across a set of resources (e.g., across a bandwidth) may be unknown to the receiving device.

To achieve a full resource block group-level precoder cycling, a large quantity of resource block groups may be used. For example, if there are four (4) beams per polarization and the cross-polarization co-phasing is equal to four (4), then sixteen resource block groups may be used to cycle through the sixteen precoders. In some examples, as the number of precoders used increases, a resource block group size (which may also be referred to as a resource block group bundling size) may decrease—e.g., to fit the resource block groups within a frequency range. In some examples, as the resource block group size decreases, a channel estimation capability of a receiving device may also be reduced—e.g., as the smaller resource blocks may provide less data for a receiving device process (e.g., to average). Conversely, as the resource block group size increases, a reduced quantity of precoders may decrease—e.g., to allow a full cycling to occur within the frequency range. In some examples, as the quantity of precoders decrease, a diversity gain from the cycled precoders may also decrease (e.g., a reduced or partial cycling may not be performed). In other examples, the quantity of precoders may be maintained, however, in such cases, a large quantity of resource blocks may be allocated to a receiving device.

Accordingly, a resource block group-level precoder cycling configuration may be selected to balance diversity gain with channel estimation performance. Thus, though reducing signaling overhead relative to closed-loop MIMO, resource block group-level precoder cycling may involve allocating a large quantity (e.g., greater than a threshold amount) of resource blocks to a receiving device (e.g., to achieve a desired diversity gain and channel estimation performance) or may result in reduced communication performance (e.g., if a quantity of cycled precoders is maintained and a smaller resource block group bundling size is used or, alternatively, if a quantity of cycled precoders is reduced and a resource block group bundling size is maintained).

Space frequency block coding (SFBC) may be used to support MIMO communications (e.g., two-port MIMO communications) that use multiple (e.g., two) spatially distinct beams. In some examples, when using SFBCs, a full rate and full diversity may be achieved for two-port MIMO (e.g., and reduced rates and diversity may be achieved for higher-order MIMO). In some examples, DMRS (e.g., two-port DMRS) are used to support MIMO communications that use SFBC.

In some examples, transparent resource block group-level precoder cycling for open-loop MIMO communications may be combined with SFBC. For example, if SFBC is used to support two-port MIMO communications, then two precoder matrices may be allocated to the two resulting beams that are used to transmit information over the same resource elements—e.g., a first precoder matrix may be used for the first beam and a second precoder matrix may be used for the second beam. In such cases, a full cycling of precoder matrices may be achieved using fewer resource block groups relative to MIMO communications that do not use SFBC— e.g., a full cycling of precoder matrices may be achieved with half of the resource blocks used to achieve full cycling when SFBC is not used.

Cyclic delay diversity may be used to support MIMO communications by applying a different phase delay to each subcarrier in a resource block group. In some examples, cyclic delay diversity may be considered a resource element-level precoder cycling technique. In some examples, cyclic delay diversity may be based on channel delay spread and a coding rate and may not provide uncoded diversity gain.

Semi-open-loop MIMO communications may reduce the signaling overhead associated with closed-loop MIMO communications while using channel state information reporting to improve communication performance relative to fully transparent open-loop MIMO. In such cases, precoder cycling may be applied based on a partial channel state information (CSI) report received from a receiving device. In one example (e.g., for mode-1 PMI), the receiving device may report an RI, a PMI indicator that includes a single wideband indication ($i_1$) for an entire CSI reporting band, a CQI, or a combination thereof, where $i_1$ may indicate the best (e.g., highest SNR) beam vector—in which case cross polarization co-phasing parameters can be cycled. In another example (e.g., for mode-2 PMI), the receiving device may report a RI, a PMI that includes a single wideband indication ($i_1$) for an entire CSI reporting band, a CQI, or a combination thereof, where $i_1$ may indicate the best (e.g., highest-SNR) beam group (e.g., including four beams), where beam and co-phasing parameters may be cycled. In another example, CSI-reference signal (CSI-RS) resources may be precoded with sampled beams, and the network entity may determine a group of precoding matrices and a corresponding cycling based on reported references signal received power (RSRP) for the CSI-RS resources.

However, similar to open-loop MIMO, semi-open-loop MIMO may allocate a large quantity of resource blocks to a receiving device to support precoder matrix cycling—e.g., for mode-1 PMI, four (4) resource block groups may be allocated per precoder matrix to support reporting the best beam and, for mode-1 PMI, sixteen (16) resource block groups may be allocated per precoder matrix to support reporting the best beam group. Accordingly, open-loop MIMO may similarly balance resource block bundling size (and channel estimation performance) with resource allocation efficiency considerations.

In massive MIMO systems, devices (e.g., network entities) may use very large quantities (relative to standard MIMO systems) of antenna components (e.g., antenna elements, antennas panels, antennas ports, or any combination thereof)—e.g., to improve spectral and energy efficiency for wireless communications.

However, the problems associated with closed-loop MIMO, open-loop MIMO, and semi-open-loop MIMO may be exacerbated as the quantity of antenna components are increased. For example, a signaling overhead may be increased for closed-loop MIMO to support additional propagation paths. In other examples, a quantity of resources allocated to open-loop MIMO and semi-open-loop MIMO may increase—e.g., to take advantage of the additional diversity provided by the additional propagation paths, and the like. Thus, mechanisms (e.g., methods, systems, apparatuses, techniques, configurations, components) that support precoder cycling with increased-efficiency resource block allocation (e.g., resource block-level or resource-element level cycling) with reduced (e.g., without) effect on channel estimation may be desired.

To support precoder cycling with increased-efficiency resource block allocation and with reduced effect on channel estimation, spatial frequency block coding and cyclic delay diversity may be used together with non-transparent precoder cycling (e.g., to receive resource element or resource block level cycling) and a DMRS bundling size may be maintained (e.g., to maintain channel estimation performance). In some examples, spatial frequency block coding and cyclic delay diversity may be complementary to one another—e.g., when more than two antenna ports are used. For instance, combined spatial frequency block coding and cyclic delay diversity scheme may be beneficial when a multiple panel network entity with cross polarization is used—e.g., to provide full diversity between different polarizations and panels.

In some examples, a device (e.g., a network entity 105 or a UE 115) may transmit, via a first beam, first representations (e.g., unmodified representations) of a first symbol ($s_1$) of a space-frequency block coded symbol pair ([$s_1$, $s_2$]) using first resources of a set of resources and first representations (e.g., modified representations, such as complex conjugate representations) of a second symbol ($s_2$) of the space-frequency block coded symbol pair using second resources of the set of resources. In some examples, the first representations of the first symbol and the first representations of the second symbol may alternate across the set of resources. The wireless device may also transmit, via a second beam, second representations (e.g., modified representations, such as complex conjugate representations) of the first symbol using the second resources and second representations (e.g., unmodified representations) of the second symbol using the first resources. The resources may be time and frequency resources. In some examples, the resources may be resource elements. In other examples, the resources may be resource blocks.

Across the set of resources, the first beam, and the second beam, each representation of the first symbol and each representation of the second symbol may be precoded using a different respective precoder of a set of precoders. For example, a first instance of a first symbol may be precoded using a first precoder and transmitted using a first resource via the first beam; a first instance of a complex conjugate of the first symbol may be precoded using a second precoder and transmitted using a second resource via the second beam; a second instance of the first symbol may be precoded using a third precoder and transmitted using a third resource via the first beam; and a fourth instance of a complex conjugate of the first symbol may be precoded using a fourth precoder and transmitted using a second resource via the second beam, and so on. In some examples, the set of precoders includes a first set of precoders that includes a first precoder that is cycled a number of times (e.g., the first precoder and the third precoder may correspond to cycled versions of the first precoder), and a second set of precoders that includes a second precoder that is cycled a number of times (e.g., the third precoder and the fourth precoder may correspond to cycled versions of the second precoder). In some examples, each of the representations of the first symbol and the second may transmitted via a respective antenna port—e.g., the device may transmit the symbols via eight different antenna ports.

By using space-frequency block coding with precoder phase cycling, a resource-level (e.g., resource element or resource block-level) cycling may be achieved.

In some examples, in addition to transmitting the first representations of the first symbol and the second representations of the second symbol with a resource-level precoder cycling (e.g., as described above), the device may also transmit a DMRS. In some examples, instead of transmitting a DMRS within each resource (e.g., to correspond to the resource used to transmit a symbol using a precoder), the device may transmit a set of DMRSs that span a bandwidth used for a communication—e.g., the bundling size of the DMRS may be larger than the bundling size of the resources used for precoder cycling. In some examples, the device transmits four DMRSs that each span the bandwidth via four DMRS ports. In some examples, the first DMRS port corresponds to the first beam and a first polarization, the second DMRS port corresponds to the first beam and a second polarization, the third DMRS port corresponds to the second beam and the first polarization, and the fourth DMRS port corresponds to the second beam and the second polarization.

By decoupling the bandwidth of the DMRS ports from the bandwidth of the data transmitted over the antenna ports using the resource-level precoder cycling and allowing the DMRS to span a larger bandwidth (e.g., the full bandwidth), a channel estimation performance may be maintained (e.g., using the wideband DMRS) while full diversity may be achieved (e.g., using the resource-level precoder cycling).

Figure 2:
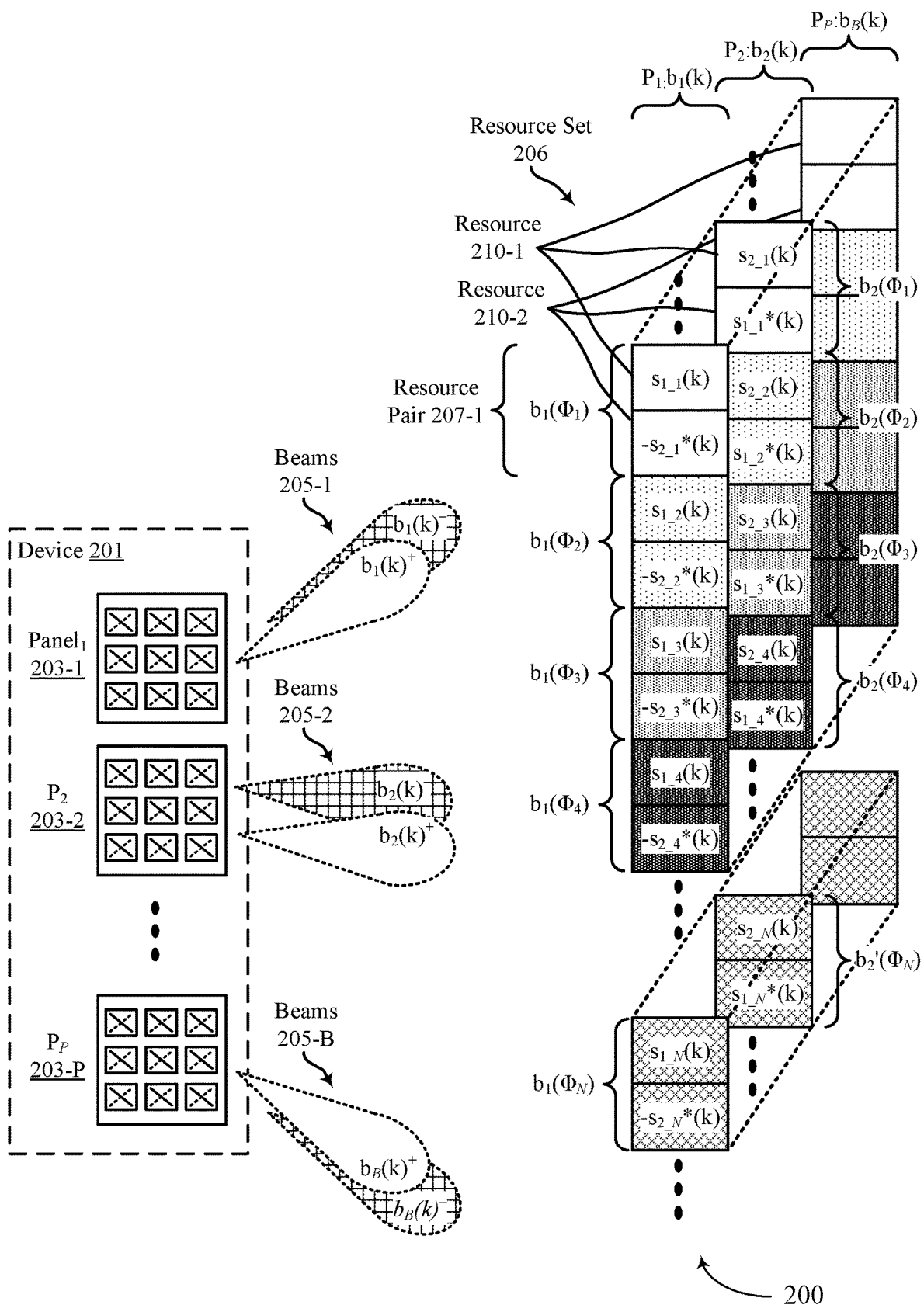
FIG. 2 shows an example of a subsystem that supports high-granularity precoder cycling with channel estimation in accordance with one or more aspects of the present disclosure.

FIG. 2 shows an example of a subsystem that supports high-granularity precoder cycling with channel estimation in accordance with one or more aspects of the present disclosure.

The subsystem 200 may includes a device 201, which may be an example of a network entity 105 or UE 115 of FIG. 1. The device 201 may be equipped with one or more of the antenna panels 203 (e.g., the first antenna panel 203-1 to the Pth antenna panel 203-P). The antenna panels 203 may be configured to form one or more respective beams (e.g., the first beam 205-1 through the Bth beam 205-B). In some examples, the device may be configured to form the first beam 205-1 using the first antenna panel 203-1 (e.g., via a first antenna port), and the second beam 205-2 using the second antenna panel 203-2 (e.g., via a second antenna port).

In some examples, the device 201 may be further configured to communicate data with another device via one or more of the antenna panels 203. As part of communicating with the other device, the device 201 may be configured to precode information signals prior to transmission—e.g., to improve a signal level of a transmission that includes the information signals. In some examples, the device 201 may be configured to transmit a same set of data in multiple information signals that are differently precoded to enable diversity combining at a receiving device, which may enable increased throughput of communications, increase a reliability of communications, or both. In some examples, the different precoders may be associated with different propagation paths between the device 201 and the receiving device. For example, a first precoder may be associated with the first beam 205-1, and a second precoder may be associated with the second beam 205-2.

As described herein, in some examples, the device 201 may be configured to achieve a resource-level precoder cycling for the information symbols transmitted by the device, using spatial frequency block coding. In such cases, the device 201 may be configured to generate pairs of space-frequency block coded symbols for pairs of information—e.g., the device 201 may be configured to generate a first pair of SFBC symbols ($\{s_1, s_2\}$). The device 201 may be further configured to transmit the representations of the first symbol, $s_1$, and the second symbol, $s_2$, over the resource set 206. The resource set 206 may include multiple time and frequency resources (e.g., a plurality of resources), including the first resource 210-1. The resources may be organized into resource pairs, including the first resource pair 207-1 (which may include the first resource 210-1 and the second resource 210-2). In some examples, the resources (e.g., the first resource 210-1) may be a resource element. In other examples, the resources (e.g., the first resource 210-1) may be a resource block. As depicted in FIG. 2, the resource set 206 may be depicted as multiple instances of the resource set 206 that, though using the same time and frequency resources, are spatially distinguished based on being transmitted across multiple beams. Thus, though depicted as multiple instances of the resource set 206, the multiple instances may represent spatially-separate instances of a single time and frequency resource set. In some examples, the multiple instances of the resource set 206 may be considered separate time, frequency, and space resource sets. Similarly, the multiple instances of a resource (e.g., the first resource 210-1) may represent spatially-separate instances of a single time and frequency resource. In some examples, the multiple instances of a resource may be considered separate time, frequency, and space resources.

In some examples, based on generating the pair of SFBC symbols, the device 201 may be configured to transmit a first representation of the first symbol, $s_1$, over a first portion of the resource set 206 via the first beam 205-1—e.g., every other resource, starting with the first resource 210-1. The device 201 may additionally be configured to transmit a second representation (e.g., a complex conjugate) of the first symbol over a second portion of the resource set 206 via the second beam 205-2—e.g., every other resource, starting with the second resource 210-2. In some examples, the first resource 210-1 and the second resource 210-2 may form a first resource pair. Also, the third resource and the fourth resource may form a second resource pair, and so on. Resource pairs may be indicated in FIG. 2 by common shading. Similarly, the device 201 may be configured to transmit a first representation (e.g., a complex conjugate) of the second symbol, $s_2$, over the second portion of the resource set 206 via the first beam 205-1—e.g., every other resource, starting with the second resource 210-2. The device 201 may additionally be configured to transmit a second representation of the second symbol over a second portion of the resource set 206 via the second beam 205-2—e.g., every other resource, starting with the first resource 210-1.

To achieve a resource-level precoder cycling of a set of precoders, the device 201 may be further configured to cycle a phase, o, of the first precoder used to form the first beam 205-1 and a phase of the second precoder used to form the second beam 205-2 every two resources (e.g., on a resource pair basis).

In one example (depicted in FIG. 2), the first precoder for the first beam 205-1 may be applied to the first resource 210-1 and the second resource 210-2 with an unmodified phase; the third resource and the fourth resource with an shifted phase (e.g., $\phi=j$); the fifth resource and the sixth resource with an shifted phase (e.g., $\phi=-1$); and the seventh resource and the eighth resource with an shifted phase (e.g., $\phi=-j$). The phase of the second precoder may be similarly cycled. Thus, the first symbol (by way of its first representations and second representations) may be cycled, on a per-resource level, at the first resource 210-1 by a first precoder $b_1(\phi_1)$, the second resource 210-2 by a second precoder $b_2(\phi_1)$, a third resource by a third precoder $b_1(\phi_2)$, a fourth resource by a fourth precoder $b_2(\phi_2)$, a fifth resource by a fifth precoder $b_1(\phi_3)$, a sixth resource by a sixth precoder $b_2(\phi_3)$, a seventh resource by a seventh precoder $b_1(\phi_4)$, an eighth resource by an eighth precoder $b_2(\phi_4)$, and so on. Similarly, the second symbol (by way of its first representations and second representations) may be cycled, on a per-resource level, at the first resource 210-1 by a first precoder $b_2(\phi_1)$, the second resource 210-2 by a second precoder $b_1(\phi_1)$, a third resource by a third precoder $b_2(\phi_2)$, a fourth resource by a fourth precoder $b_1(\phi_2)$, a fifth resource by a fifth precoder $b_2(\phi_3)$, a sixth resource by a sixth precoder $b_1(\phi_3)$, a seventh resource by a seventh precoder $b_2(\phi_4)$, an eighth resource by an eighth precoder $b_1(\phi_4)$, and so on. Precoder cycling on a per-resource pair basis is described in more detail herein, including with reference to FIG. 4. In another example, precoder cycling may be performed on a per-resource basis as described in more detail herein, including with reference to FIG. 5.

In addition to the resource-level precoder cycling, the device 201 may be configured to transmit one or more DMRS signals via one or more DMRS ports. In some examples, instead of transmitting the one or more DMRS signals over the same quantity of DMRS ports as the quantity of precoders in the set of cycled precoders (e.g., as the same quantity of antenna ports), the device 201 may be configured to transmit the one or more DMRS signals over a fewer quantity of DMRS ports. For example, if two beams are formed by the device 201, the device 201 may be configured to transmit four DMRS signals over four DMRS ports. In some examples, each DMRS port is associated with a beam and a polarization. For example, if two beams are formed by the device 201, a first DMRS port may be associated with the first beam 205-1 and a first (e.g., a positive) polarization; a second DMRS port may be associated with the first beam 205-1 and a second (e.g., a negative) polarization; a third DMRS port may be associated with the second beam 205-2 and the first polarization; and a fourth DMRS port may be associated with the second beam 205-2 and the second polarization.

In some examples, the bandwidth of the DMRS signals may also span a larger bandwidth than that of a resource (e.g., the first resource 210-1) using the resource-level precoder cycling. In some examples, by using a larger-bandwidth DMRS, an improved estimate of the channel between the device 201 and the receiving device may be obtained. In some examples, the bandwidth of the DMRS signals may span the full carrier bandwidth allocated to communications between the device 201 and the receiving device. DMRS transmission is described in more detail herein, including with reference to FIG. 6.

Figure 3:
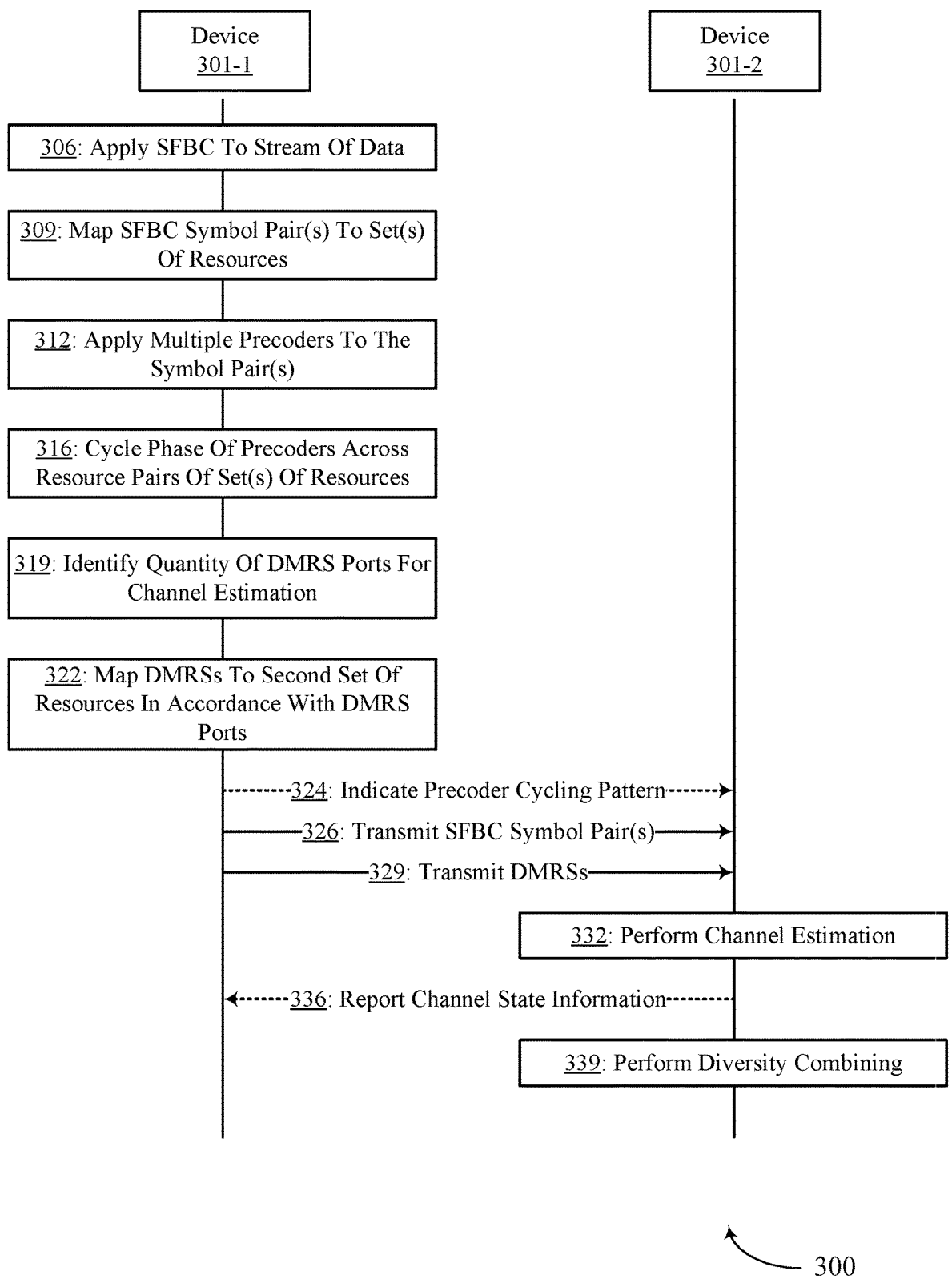
FIG. 3 shows an example of a set of operations for high-granularity precoder cycling with channel estimation in accordance with one or more aspects of the present disclosure.

FIG. 3 shows an example of a set of operations for high-granularity precoder cycling with channel estimation in accordance with one or more aspects of the present disclosure.

The process flow 300 may be performed by the first device 301-1 and the second device 301-2. The first device 301-1 may be an example of a device (e.g., a network entity 105 of FIG. 1, the device 201 of FIG. 2) described herein. The second device 301-2 may be an example of a device (e.g., a UE 115 of FIG. 1) described herein. In some examples, the process flow 300 shows an example set of operations performed to support high-granularity precoder cycling with channel estimation. For example, the process flow 300 may include operations for preparing and communicating a transmission that includes data signals that are precoded at a resource-level and includes DMRSs that are decoupled from (e.g., in bandwidth or bundling size) the data signals.

At 306, spatial frequency block coding may be applied to a stream of data (e.g., by the first device 301-1). A stream of spatial-frequency block coded symbol pairs may be obtained for the stream of data. For example, for a first set of one or more bits in the stream of data and a second set of one or more bits in the stream of data, a first symbol and a second symbol may be generated. Also, a complex conjugate of the first symbol and a complex conjugate of the second symbol may be generated.

Figure 4:
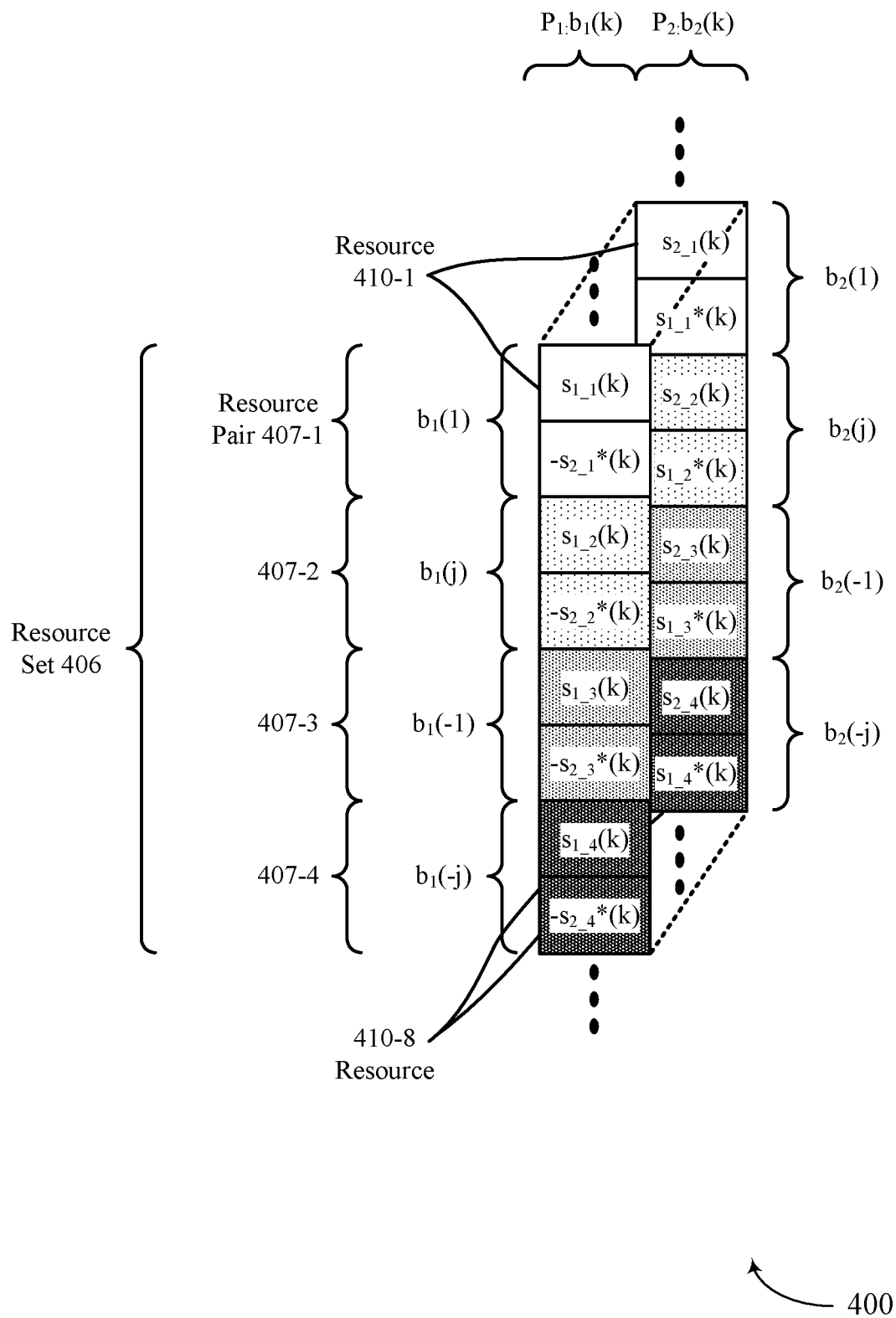
FIG. 4 shows an example of a resource diagram that supports high-granularity precoder cycling with channel estimation in accordance with one or more aspects of the present disclosure.

At 309, the SFBC symbol pairs may be mapped to sets of resources (e.g., by the first device 301-1). In some examples, mapping an SFBC symbol pair may include mapping a first symbol ($s_1$) of the SFBC symbol pair to a first resource of the sets of resources and a different representation (e.g., a complex conjugate) of the first symbol to a second resource of the sets of resources. Mapping the SFBC symbol pair may further include mapping a second symbol ($s_2$) of the SFBC symbol pair to the first resource of the sets of resources and a different representation (e.g., a complex conjugate) of the second symbol to the second resource of the sets of resources. In some examples, mapping an SFBC symbol pair may further include mapping the SFBC symbol pair to one or more additional resource pairs, as described in more detail herein, including with reference to FIG. 4, which shows mapping an SFBC symbol pair to four resource pairs. As shown in FIG. 4, the resource set may be represented as separate resource sets, where each resource set may be associated with a respective beam. In such cases, the first symbol of the SFBC symbol pair and the different representation (e.g., a complex conjugate) of the second symbol of the SFBC symbol pair may be associated with a first beam while the different representation (e.g., a complex conjugate) of the first symbol of the SFBC symbol pair and the second symbol of the SFBC symbol pair may be associated with a second beam. In some examples, the sets of resources may include sets of resource elements. In other examples, the sets of resources may include sets of resource blocks.

At 312, multiple precoders may be applied (e.g., by the first device 301-1) to the symbols pairs that are mapped to the sets of resources. In some examples, a first precoder ($b_1$) may be used to form a first beam (e.g., via a first antenna panel and a first antenna port) and a second precoder ($b_2$) may be used to form a second beam (e.g., via a second antenna panel and a second antenna port). The first precoder may be applied to a first combination of a symbol pair, and the second precoder may be applied to a second combination of the symbol pair. In such cases, a resource set may be represented as two instances of the resource set that are used to transmit the different combinations of the symbol pair, as described herein, including with reference to FIGS. 4 and 5.

At 316, the phase ($\phi$) of the multiple precoders may be cycled (e.g., by the first device 301-1) across the resource pairs of the sets of resources. In some examples, when two beams are used, the phase of the first precoder and the phase of the second precoder may both be cycled in accordance with the series ($\{1, j, -1, -j\}$) of a resource set. In such cases, the resulting phase cycled versions of the precoders may be applied to different resource pairs of the resource set, as described in more detail herein, including with reference to FIG. 4. That is, a first unmodified version of the first precoder ($b_1(1)$) and the second precoder ($b_2(1)$) may be applied to the first resource pair of the resource set, a second version of the first precoder ($b(j)$) and the second precoder ($b_2(j)$) may be applied to the second resource pair of the resource set; a third version of the first precoder ($b_1(-1)$) and the second precoder ($b_2(-1)$) may be applied to the third resource pair of the resource set; and a fourth version of the first precoder ($b_1(-j)$) and the second precoder ($b_2(-j)$) may be applied to the fourth resource pair of the resource set.

Accordingly, across the resources of the resource set, each of the eight different precoders may be applied to both of the symbols in a symbol pair on a per-resource level. That is, the precoders may be cycled for the first symbol as follows: $b_1(1) \cdot s_1$; $b_2(1) \cdot s^*_1$; $b_1(j) \cdot s_1$; $b_2(j) \cdot s^*_1$; $b_1(-1) \cdot s_1$; $b_2(-1) \cdot s^*_1$; $b_1(-j) \cdot s_1$; $b_2(-j) \cdot s^*_1$. And, similarly, the precoders may be cycled for the second symbol as follows: $b_2(1) \cdot s_2$; $b_1(1) \cdot -s^*_2$; $b_2(j) \cdot s_2$; $b_1(j) \cdot -s^*_2$; $b_2(-1) \cdot s_2$; $b_1(-1) \cdot -s^*_2$; $b_2(-j) \cdot s_2$; $b_1(-j) \cdot -s^*_2$.

Accordingly, multiple beam precoders, $b_i(k)$, may be constructed in accordance with the following equation:

$$[y(2k)\ y(2k+1)] = [H_1(k)B_1(k)\ H_2(k)B_2(k)] \begin{bmatrix} s_1(k) & -s^*_2(k) \\ s_2(k) & s^*_1 k \end{bmatrix} + [n(2k)\ n(2k+1)],$$

where $b_i(k)$ may be a Type-1 precoding matrix, such as $$B_i(k) = \begin{bmatrix} X_i \\ e^{j\phi(k)} X_i \end{bmatrix}.$$

In some examples, $e^{j\phi(l)} \in \{1, j, -1, -j\}$. By cycling the phase of the precoder applied to the resource pairs, the corresponding beam may effectively be swept across a corresponding set of beam directions—e.g., using cyclic delay diversity (CDD).

In another example, the phase ($\phi$) of the multiple precoders may be cycled (e.g., by the first device 301-1) across each resource of the sets of resources. In some examples, when two beams are used, the phase of the first precoder and the phase of the second precoder may both be cycled on a per-resource basis in accordance with the series ({1, j, −1, −j}) of a resource set. In such cases, the resulting phase cycled versions of the precoders may be applied to different resources of the resource set, as described in more detail herein, including with reference to FIG. 5.

At 319, a quantity of DMRS ports to support estimating the channel between the first device 301-1 and the second device 301-2 may be determined (e.g., by the first device 301-1). In some examples, the quantity of DMRS ports is determined to be twice the number of beams (or layers) used for a transmission. The DMRSs transmitted over each DMRS port may be precoded with a corresponding precoder. In some examples, the DMRSs are each transmitted with a unique precoder/polarization combination. For example, if two beams are used, four DMRS ports may be determined for channel estimation. In such cases, the first DMRS port may be associated with a first precoder (e.g., the precoder used to form the first beam) and a first polarization, the second DMRS port may be associated with the first precoder and a second polarization, the third DMRS port may be associated with a second precoder (e.g., the precoder used to form the second beam) and the first polarization, and the fourth DMRS port may be associated with the second precoder and the second polarization. For example, the first DMRS port may be associated with $b_1(k)$ and a positive polarization; the second DMRS port may be associated with $b_1(k)$ and a negative polarization; the third DMRS port may be associated with $b_2(k)$ and the positive polarization; and the fourth DMRS port may be associated with $b_2(k)$ and the negative polarization.

At 322, the DMRS signals may be mapped (e.g., by the first device 301-1) to a second set of resources. The second set of resources may be larger than a set of resources of the sets of resources that the SFBC symbol pairs are mapped to. In some examples, the second set of resources may extend across a bandwidth (e.g., of a carrier) used for communications between the first device 301-1 and the second device 301-2 Mapping DMRS symbols to the second set of resource is described in more detail herein, including with reference to FIG. 6.

At 324, the pattern of the precoder cycling may be indicated to the second device 301-2. In some examples, the precoder cycling pattern may be signaled to the second device 301-2 in advance of a data transmission (e.g., during previous DCI, MAC-layer, or RRC-layer signaling). In some examples, rather than signaling the precoder cycling pattern, the second device 301-2 may determine the precoder cycling pattern based on a predetermined precoder cycling pattern—e.g., that is stored in the second device 301-2.

At 326, the SFBC symbol pairs may be transmitted to the second device 301-2 in accordance with the precoder cycling described herein. In some examples, the first device 301-1 may transmit a first SFBC symbol pair to the second device 301-2 using a first set of resources, where the symbols of the first SFBC symbol pair may be precoded across the first set of resources in accordance with a resource-level precoder cycling. The first device 301-1 may similarly transmit a second SFBC symbol pair to the second device 301-2 using a second set of resources (e.g., that are common in time or frequency). And so on.

At 329, the DMRSs may be transmitted to the second device 301-2 in accordance with the identified DMRS ports. As described herein, the DMRSs may be decoupled from the SFBC symbol transmission, such that a size of a resource used to transmit a first precoded symbol may be different than a size of a DMRS transmitted using a DMRS port.

At 332, an estimate of the channel between the first device 301-1 and the second device may be performed (e.g., by the second device 301-2). In some examples, the second device 301-2 uses the DMRS to obtain the channel estimate. For example, when two beams are used, the second device 301-2 may be configured to estimate the first component ($H_1^+$) of the first channel ($H_1$) associated with the first beam using the DMRS transmitted on the first DMRS port (precoded with $b_1(k)$ and using the positive polarization) and the second component ($H_1^-$) of the first channel ($H_1$) associated with the first beam using the DMRS transmitted on the second DMRS port (precoded with $b_1(k)$ and using the negative polarization). Similarly, the second device 301-2 may estimate the first component ($H_2^+$) of the second channel ($H_2$) associated with the first beam using the DMRS transmitted on the first DMRS port (precoded with $b_2(k)$ and using the positive polarization) and the second component ($H_2^-$) of the first channel ($H_2$) associated with the first beam using the DMRS transmitted on the second DMRS port (precoded with $b_2(k)$ and using the negative polarization). In some examples, the second device 301-2 may obtain a wideband channel estimate for both of the channels based on the received DMRSs.

More generally, if multiple beams are used, then the channel associated with the different beams may be obtained by measuring the DMRSs received on corresponding sets of DMRS ports 2$i$-1 and 2$i$, where i may correspond to the ith beam. That is, for a first beam, DMRS ports 1 and 2 may be used to obtain a channel estimate for the first beam, for a second beam, DMRS ports 3 and 4 may be used to obtain a channel estimate for the second beam, for a third beam, DMRS ports 5 and 6 may be used to obtain a channel estimate for the second beam, and so on.

In some examples, the channel estimate obtained using the DMRS may be used to formulate an equivalent channel for the data signals received over the different resources. In some examples, the second device 301-2 may formulate the equivalent channel for the data signals in accordance with the determined precoder cycling and respective precoders applied to the different data signals.

At 336, channel state information for the DMRS, the data channels corresponding to the different precoders, or both, may be reported to the first device 301-1. In some examples, the first device 301-1 may use the received channel state information to adapt subsequent transmissions to the second device 301-2 via the different precoders.

At 339, diversity combining of the received SFBC symbol pairs may be performed. In some examples, the second device 301-2 may be configured to combine each of the representations of a first symbol and a second symbol in an SFBC symbol pair received across a set of beams using a set of resources and in accordance with a set of cycled precoders. By diversity combining the representations of the first symbol and combining the representations of the second symbols, a signal quality of the first symbol and a signal quality of the second symbol received at the second device 301-2 may be improved.

Accordingly, by applying a resource-level precoder cycling to SFBC symbol pairs while using multiple resource-level DMRSs, diversity for a data signal may be achieved in a small amount of resources (e.g., relative to prior open-loop and semi-open-loop MIMO techniques) with minimal (e.g., without) effect on an estimation of the multi-path channels between the first device 301-1 and the second device 301-2. Accordingly, communications between transmitting device and a receiving device may be improved by resource-efficient diversity combining as well as by more-reliable wideband channel reporting for the multi-path channels, which may be used to adapt transmission parameters within the multi-path channels.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement or be combined with one or more of the operations described in the process flow 300.

FIG. 4 shows an example of a resource diagram that supports high-granularity precoder cycling with channel estimation in accordance with one or more aspects of the present disclosure.

The resource diagram 400 may depict a resource set 406 that includes multiple resource pairs (first resource pair 407-1 through fourth resource pair 407-4). The resource set 406 may include the resources 410 (including first resource 410-1 to eighth resource 410-8). The resources 410 may each be resource elements or resource blocks. The resource diagram 400 may further show that the resource set 406 is transmitted via multiple beams. In some examples, the multiple beams are transmitted using multiple antenna ports, multiple antenna panels, or both. In some examples, a first precoder ($b_1(k)$) is used to form the first beam and is associated with the first (front-most) instance of the resource set 406, and a second precoder ($b_2(k)$) is used to form the second beam and is associated with the second (rear-most) instance of the resource set 406.

As described herein, an SFBC symbol pair ($[s_1, s_2]$) may be mapped to the resource set 406, such that first representations of a first symbol of the SFBC symbol pair ($s_1$) may be mapped to first resources of the resource set 406 (the first resource 410-1, the third resource, the fifth resource, and the seventh resource) and second representations of the first symbol ($s^*_1$) of the SFBC symbol pair may be mapped to second resources of the resource set 406 (the second resource, the fourth resource, the sixth resource, and the eighth resource 410-8). Similarly, first representations of a second symbol of the SFBC symbol pair ($s_2$) may be mapped to the first resources of the resource set 406 (the first resource 410-1, the third resource, the fifth resource, and the seventh resource) and second representations of the second symbol ($s^*_2$) of the SFBC symbol pair may be mapped to the second resources of the resource set 406 (the second resource, the fourth resource, the sixth resource, and the eighth resource 410-8).

In some examples, the first precoder may be phase-cycled on a per-resource pair basis, and the second precoder may similarly be phase-cycled on a per-resource pair basis. In some examples, the first precoder and the second precoder are cycled in accordance with the following pattern [1, j, −1, −j]. Cycling the phase of the precoders may be equivalent to applying CDD to a transmitted signal. Accordingly, as described herein, across the two beam precoders and the four phase cycles, eight different precoders (${b_1(k)·\phi=1; b_1(k)·\phi=j; b_1(k)·\phi=-1; b_1(k)·\phi=-j; b_2(k)·\phi=1; b_2(k)·\phi=j; b_2(k)·\phi=-1; b_2(k)·\phi=-1}$) may be applied across the representations of the symbols ($[s_1, s_2]$).

Figure 5:
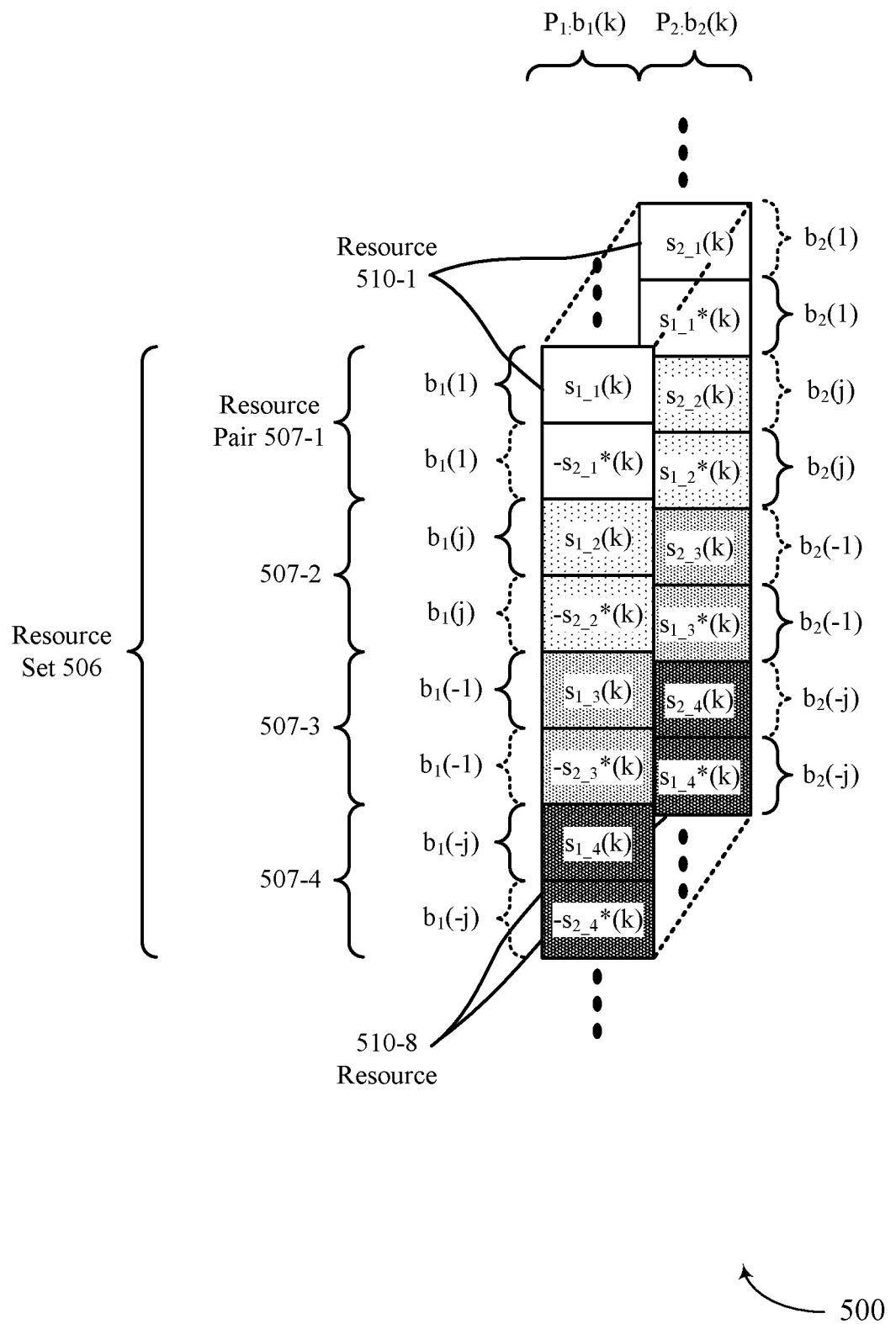
FIG. 5 shows an example of a resource diagram that supports high-granularity precoder cycling with channel estimation in accordance with one or more aspects of the present disclosure.

FIG. 5 shows an example of a resource diagram that supports high-granularity precoder cycling with channel estimation in accordance with one or more aspects of the present disclosure.

The resource diagram 500 may depict a resource set 506 that includes multiple resource pairs (first resource pair 507-1 through fourth resource pair 507-4). The resource set 506 may include the resources 510 (including first resource 510-1 to eighth resource 510-8). The resources 510 may each be resource elements or resource blocks. The resource diagram 500 may further show that the resource set 506 is transmitted via multiple beams. In some examples, the multiple beams are transmitted using multiple antenna ports, multiple antenna panels, or both. In some examples, a first precoder ($b_1(k)$) is used to form the first beam and is associated with the first (front-most) instance of the resource set 506, and a second precoder ($b_2(k)$) is used to form the second beam and is associated with the second (rear-most) instance of the resource set 506.

As described herein, an SFBC symbol pair ($[s_1, s_2]$) may be mapped to the resource set 506, such that first representations of a first symbol of the SFBC symbol pair ($s_1$) may be mapped to first resources of the resource set 506 (the first resource 510-1, the third resource, the fifth resource, and the seventh resource) and second representations of the first symbol ($s^*_1$) of the SFBC symbol pair may be mapped to second resources of the resource set 506 (the second resource, the fourth resource, the sixth resource, and the eighth resource 510-8). Similarly, first representations of a second symbol of the SFBC symbol pair ($s_2$) may be mapped to the first resources of the resource set 506 (the first resource 510-1, the third resource, the fifth resource, and the seventh resource) and second representations of the second symbol ($s^*_2$) of the SFBC symbol pair may be mapped to the second resources of the resource set 506 (the second resource, the fourth resource, the sixth resource, and the eighth resource 510-8).

In some examples, the first precoder may be phase-cycled on a per-resource basis, and the second precoder may similarly be phase-cycled on a per-resource basis. In some examples, the first precoder and the second precoder are cycled in accordance with the following pattern $[1, j, -1, -j]$. Cycling the phase of the precoders may be equivalent to applying CDD to a transmitted signal. Accordingly, as described herein, across the two beam precoders and the four phase cycles, eight different precoders ($\{b_1(k)\cdot\phi=1; b_1(k)\cdot\phi=j; b_1(k)\cdot\phi=-1; b_1(k)\cdot\phi=-j; b_2(k)\cdot\phi=1; b_2(k)\cdot\phi=j; b_2(k)\cdot\phi=-1; b_2(k)\cdot\phi=-j\}$) may be applied across the representations of the symbols ($[s_1, s_2]$).

Figure 6:
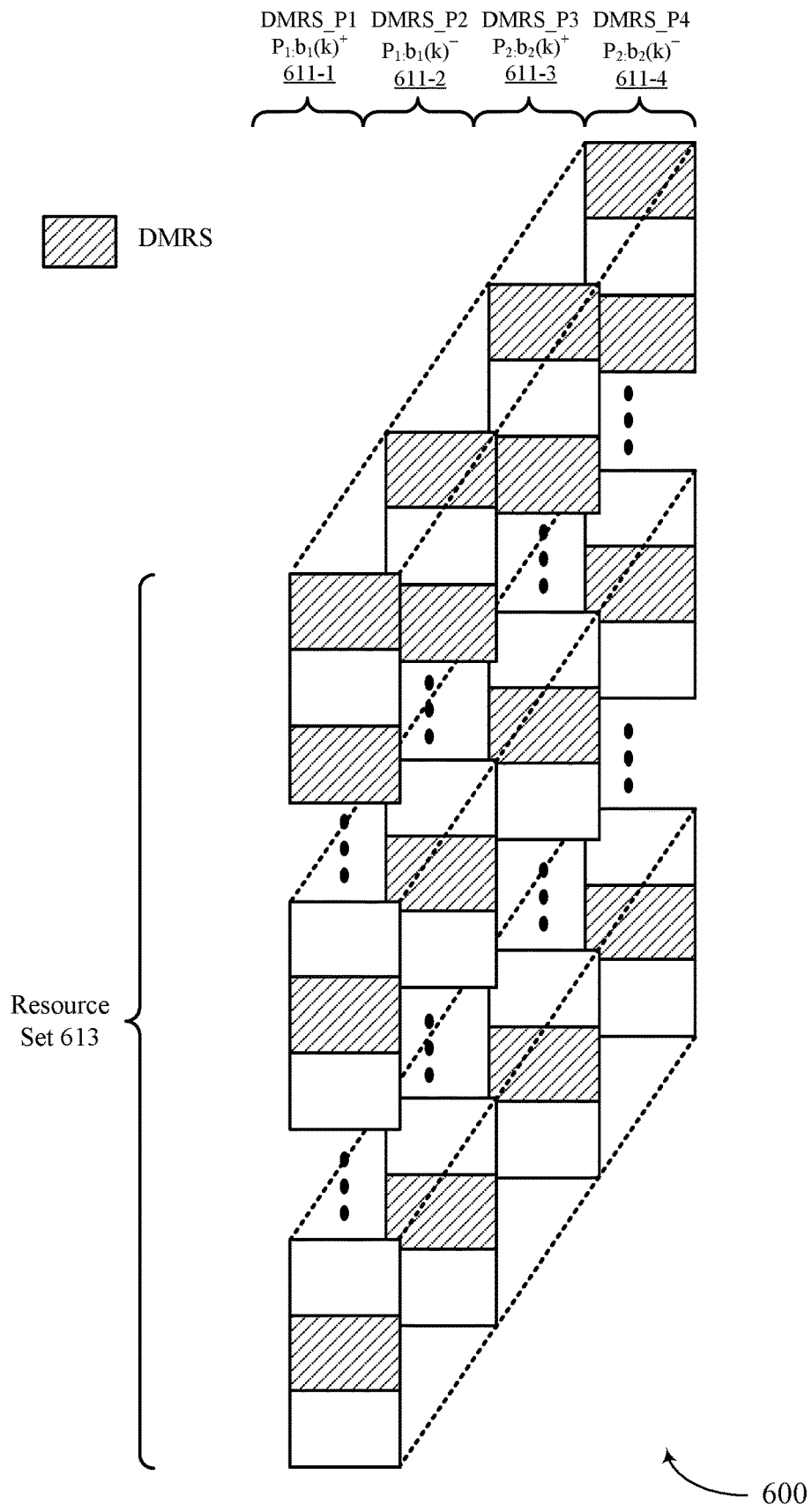
FIG. 6 shows an example of a resource diagram that supports high-granularity precoder cycling with channel estimation in accordance with one or more aspects of the present disclosure.

FIG. 6 shows an example of a resource diagram that supports high-granularity precoder cycling with channel estimation in accordance with one or more aspects of the present disclosure.

The resource diagram 600 may depict the transmission of multiple DMRSs across the DMRS ports 611 (which may include first DMRS port 611-1 through fourth DMRS port 611-4). In some examples, a first DMRS may be transmitted using the first DMRS port 611-1—e.g., in accordance with a first beam precoder and a positive polarization. A second DMRS may be transmitted using the second DMRS port 611-2—e.g., in accordance with the first beam precoder and a negative polarization. A third DMRS may be transmitted using the third DMRS port 611-3—e.g., in accordance with a second beam precoder and the positive polarization. And a fourth DMRS may be transmitted using the fourth DMRS port 611-4—e.g., in accordance with the second beam precoder and the negative polarization. In some examples, the first beam precoder may be equivalent to the precoder used to form a first beam for transmitting an SFBC symbol pair, and the second beam precoder may be equivalent to the precoder used to form a second beam for transmitting the SFBC symbol pair, as described herein, including with reference to FIGS. 4 and 5.

In some examples, each DMRS may be transmitted across a resource set 613. A size of the resource set 613 may be larger than a size of a resource set used to transmit an SFBC symbol pair, as described herein, including with reference to FIG. 4. In some examples, the resource set 613 may span a bandwidth (e.g., of a carrier) used for communications between two devices.

Figure 7:
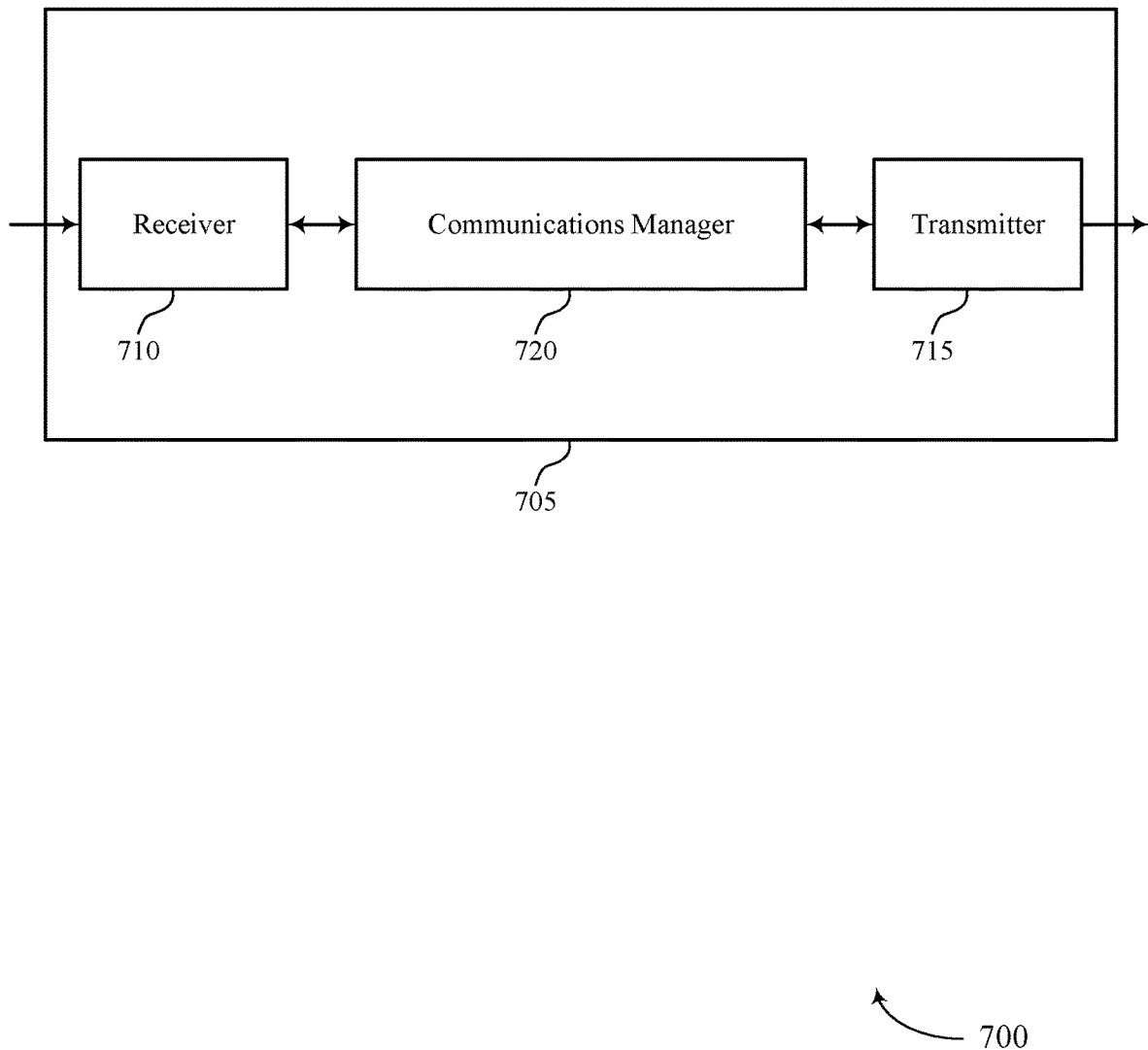
FIGS. 7 and 8 show block diagrams of devices that support high-granularity precoder cycling with channel estimation in accordance with one or more aspects of the present disclosure.

FIG. 7 shows a block diagram 700 of a device 705 that supports high-granularity precoder cycling with channel estimation in accordance with one or more aspects of the present disclosure. The device 705 may be an example of aspects of a network entity 105 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to, individually or collectively, support or enable the described techniques. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of high-granularity precoder cycling with channel estimation as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. For example, the communications manager 720 is capable of, configured to, or operable to support a means for transmitting, via a first beam, first representations of a first symbol of a space-frequency block coded symbol pair using first resources of a set of multiple resources and first representations of a second symbol of the space-frequency block coded symbol pair using second resources of the set of multiple resources, where the set of multiple resources are a set of multiple time and frequency resources. The communications manager 720 is capable of, configured to, or operable to support a means for transmitting, via a second beam, second representations of the first symbol using the second resources and second representations of the second symbol using the first resources of the set of multiple resources, where across the set of multiple resources, the first beam, and the second beam, each representation of the first symbol and each representation of the second symbol is precoded by a different respective precoder of a set of multiple precoders.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for performing precoder cycling with increased-efficiency resource block allocation and with reduced effect on channel estimation.

Figure 8:
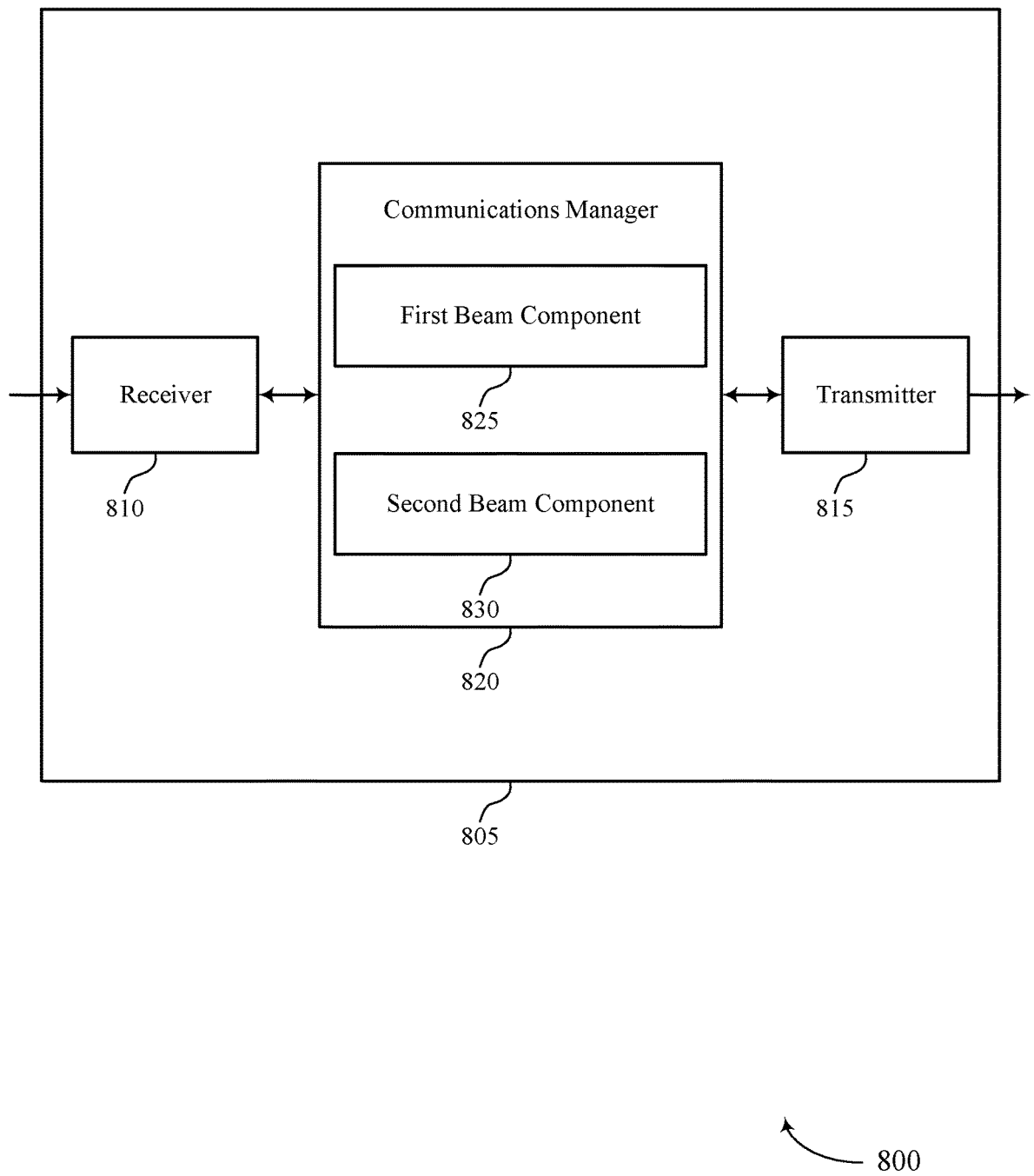

FIG. 8 shows a block diagram 800 of a device 805 that supports high-granularity precoder cycling with channel estimation in accordance with one or more aspects of the present disclosure. The device 805 may be an example of aspects of a device 705 or a network entity 105 as described herein. The device 805 may include a receiver 810, a transmitter 815, and a communications manager 820. The device 805, or one of more components of the device 805 (e.g., the receiver 810, the transmitter 815, and the communications manager 820), may include at least one processor, which may be coupled with at least one memory, to support the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of high-granularity precoder cycling with channel estimation as described herein. For example, the communications manager 820 may include a first beam component 825 a second beam component 830, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. The first beam component 825 is capable of, configured to, or operable to support a means for transmitting, via a first beam, first representations of a first symbol of a space-frequency block coded symbol pair using first resources of a set of multiple resources and first representations of a second symbol of the space-frequency block coded symbol pair using second resources of the set of multiple resources, where the set of multiple resources are a set of multiple time and frequency resources. The second beam component 830 is capable of, configured to, or operable to support a means for transmitting, via a second beam, second representations of the first symbol using the second resources and second representations of the second symbol using the first resources of the set of multiple resources, where across the set of multiple resources, the first beam, and the second beam, each representation of the first symbol and each representation of the second symbol is precoded by a different respective precoder of a set of multiple precoders.

Figure 9:
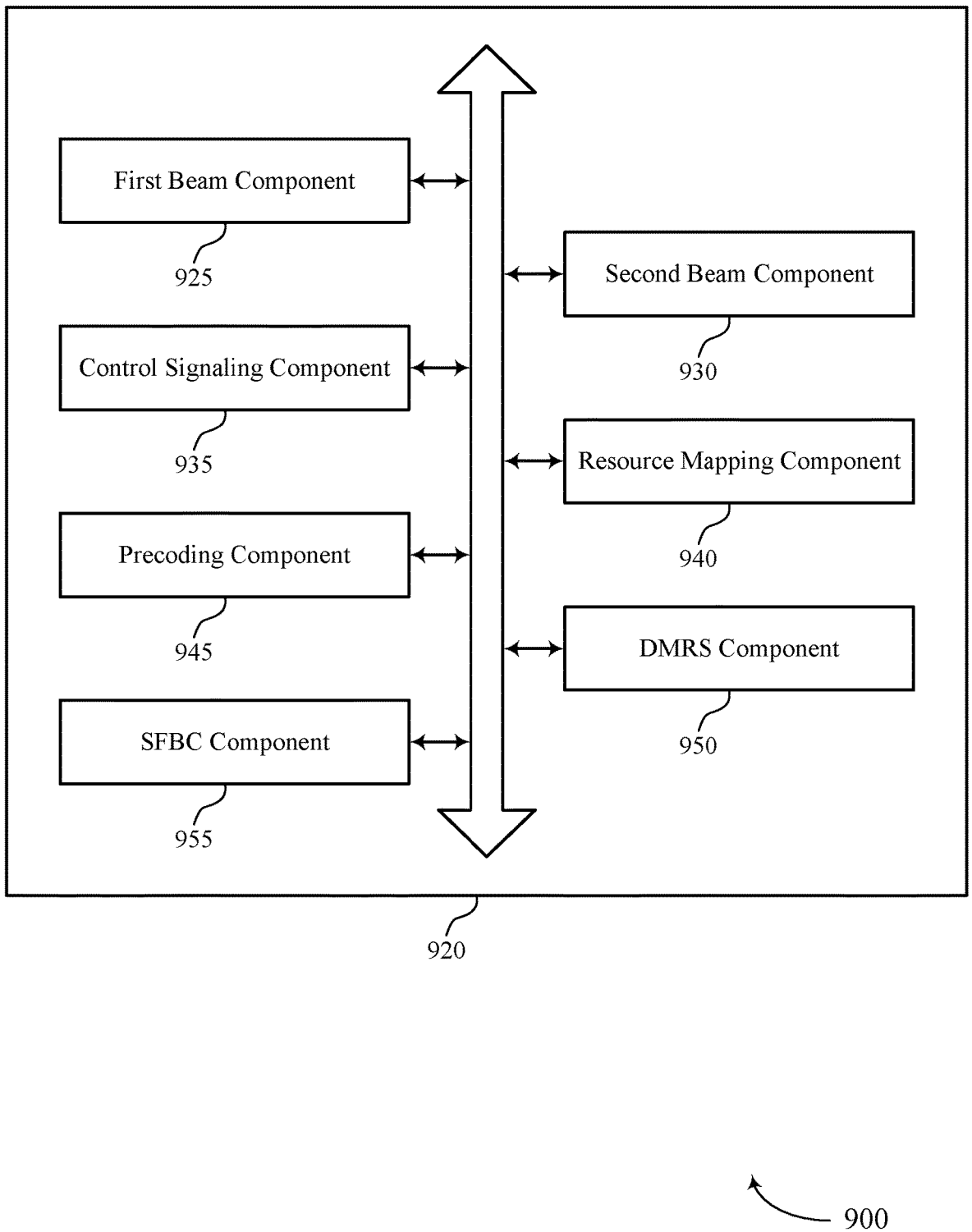
FIG. 9 shows a block diagram of a communications manager that supports high-granularity precoder cycling with channel estimation in accordance with one or more aspects of the present disclosure.

FIG. 9 shows a block diagram 900 of a communications manager 920 that supports high-granularity precoder cycling with channel estimation in accordance with one or more aspects of the present disclosure. The communications manager 920 may be an example of aspects of a communications manager 720, a communications manager 820, or both, as described herein. The communications manager 920, or various components thereof, may be an example of means for performing various aspects of high-granularity precoder cycling with channel estimation as described herein. For example, the communications manager 920 may include a first beam component 925, a second beam component 930, a control signaling component 935, a resource mapping component 940, a precoding component 945, a DMRS component 950, an SFBC component 955, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications in accordance with examples as disclosed herein. The first beam component 925 is capable of, configured to, or operable to support a means for transmitting, via a first beam, first representations of a first symbol of a space-frequency block coded symbol pair using first resources of a set of multiple resources and first representations of a second symbol of the space-frequency block coded symbol pair using second resources of the set of multiple resources, where the set of multiple resources are a set of multiple time and frequency resources. The second beam component 930 is capable of, configured to, or operable to support a means for transmitting, via a second beam, second representations of the first symbol using the second resources and second representations of the second symbol using the first resources of the set of multiple resources, where across the set of multiple resources, the first beam, and the second beam, each representation of the first symbol and each representation of the second symbol is precoded by a different respective precoder of a set of multiple precoders.

In some examples, the control signaling component 935 is capable of, configured to, or operable to support a means for signaling, to a second wireless device, an indication of a correspondence between each precoder of the set of multiple precoders and each resource of the set of multiple resources.

In some examples, the resource mapping component 940 is capable of, configured to, or operable to support a means for mapping the first representations of the first symbol to the first resources and the second representations of the first symbol to the second resources. In some examples, the precoding component 945 is capable of, configured to, or operable to support a means for applying, based on the mapping, a first set of precoders of the set of multiple precoders to the first resources, where the first set of precoders are used for transmissions via the first beam, and where respective phases of the first set of precoders are offset from one another. In some examples, the precoding component 945 is capable of, configured to, or operable to support a means for applying, based on the mapping, a second set of precoders of the set of multiple precoders to the second resources, where the second set of precoders are used for transmissions via the second beam, and where respective phases of the second set of precoders are offset from one another.

In some examples, the precoding component 945 is capable of, configured to, or operable to support a means for cycling a phase of a first precoder to obtain a first set of multiple cycled precoders, where the first set of precoders includes the first set of multiple cycled precoders. In some examples, the precoding component 945 is capable of, configured to, or operable to support a means for cycling a phase of a second precoder to obtain a second set of multiple cycled precoders, where the second set of precoders includes the second set of multiple cycled precoders.

In some examples, the DMRS component 950 is capable of, configured to, or operable to support a means for transmitting, via the first beam, a first set of multiple demodulation reference signals using a second set of multiple resources, where a bandwidth of the second plurality of resources is larger than a bandwidth of the first set of multiple resources. In some examples, the DMRS component 950 is capable of, configured to, or operable to support a means for transmitting, via the second beam, a second set of multiple demodulation reference signals using a third set of multiple resources, where a bandwidth of the third set of multiple resources is larger than the bandwidth of the first set of multiple resources.

In some examples, a first demodulation reference signal of the first set of multiple demodulation reference signals is transmitted via a first demodulation reference signal port that corresponds to the first beam and a first polarization, a second demodulation reference signal of the first set of multiple demodulation reference signals is transmitted via a second demodulation reference signal port that corresponds to the first beam and a second polarization, a first demodulation reference signal of the second set of multiple demodulation reference signals is transmitted via a third demodulation reference signal port that corresponds to the second beam and the first polarization, and a second demodulation reference signal of the second set of multiple demodulation reference signals is transmitted via a fourth demodulation reference signal port that corresponds to the second beam and the second polarization.

In some examples, the first demodulation reference signal of the first set of multiple demodulation reference signals and the first demodulation reference signal of the second set of multiple demodulation reference signals are associated with an estimate of a first polarized component of a channel between the wireless device and a second wireless device, and the second demodulation reference signal of the first set of multiple demodulation reference signals and the second demodulation reference signal of the second set of multiple demodulation reference signals are associated with an estimate of a second polarized component of the channel.

In some examples, a multiple-input, multiple-output signal is transmitted from the wireless device to a second wireless device based on transmitting the first representations of the first symbol, the first representations of the second symbol, the second representations of the first symbol, and the second representations of the second symbol, and the first representations of the first symbol, the second representations of the first symbol, the first representations of the second symbol, and the second representations of the second symbol enable diversity combining of the first symbol and the second symbol at the second wireless device.

In some examples, a first antenna panel of the wireless device includes a first set of antennas and is associated with a first set of antenna ports, and a second antenna panel of the wireless device includes a second set of antennas and is associated with a second set of antenna ports.

In some examples, the SFBC component 955 is capable of, configured to, or operable to support a means for encoding a stream of data symbols using a spatial frequency block coding scheme to obtain a stream of space-frequency block coded symbol pairs including the space-frequency block coded symbol pair that includes the first symbol and the second symbol. In some examples, the resource mapping component 940 is capable of, configured to, or operable to support a means for mapping, based on the encoding, a first representation of the first symbol to each resource of the first resources and a first representation of the second symbol to each resource of the second resources, and a second representation of the first symbol to each resource of the second resources and a second representation of the second symbol to each resource of the first resources, where the first representations of the first symbol, the second representations of the first symbol, the first representations of the second symbol, and the second representations of the second symbol are transmitted based on the mapping.

In some examples, across the first beam and the second beam, each representation of the first symbol is conveyed via a respective resource of the set of multiple resources, across the first beam and the second beam, each representation of the second symbol is conveyed via a respective resource of the set of multiple resources, and each resource of the set of multiple resources is a resource element or a resource block.

Figure 10:
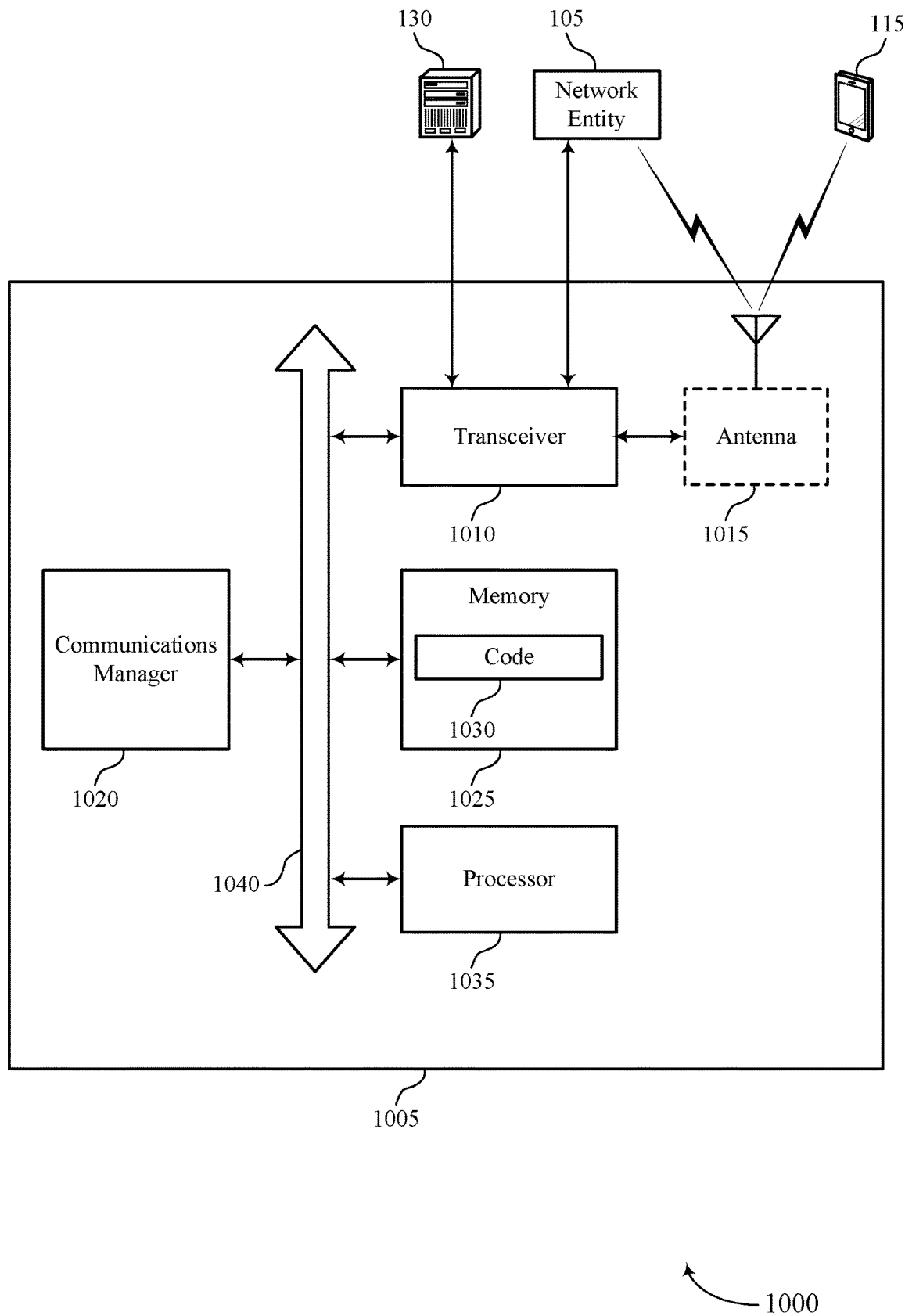
FIG. 10 shows a diagram of a system including a device that supports high-granularity precoder cycling with channel estimation in accordance with one or more aspects of the present disclosure.

FIG. 10 shows a diagram of a system 1000 including a device 1005 that supports high-granularity precoder cycling with channel estimation in accordance with one or more aspects of the present disclosure. The device 1005 may be an example of or include the components of a device 705, a device 805, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, at least one memory 1025, code 1030, and at least one processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or one or more memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or one or more memory components (e.g., the at least one processor 1035, the at least one memory 1025, or both), may be included in a chip or chip assembly that is installed in the device 1005. In some examples, the transceiver 1010 may be operable to support communications via one or more communications links (e.g., a communication link 125, a backhaul communication link 120, a midhaul communication link 162, a fronthaul communication link 168).

The at least one memory 1025 may include RAM, ROM, or any combination thereof. The at least one memory 1025 may store computer-readable, computer-executable code 1030 including instructions that, when executed by one or more of the at least one processor 1035, cause the device 1005 to perform various functions described herein. The code 1030 may be stored in a non-transitory computer-readable medium such as system memory or another type of memory. In some cases, the code 1030 may not be directly executable by a processor of the at least one processor 1035 but may cause a computer (e.g., when compiled and executed) to perform functions described herein. In some cases, the at least one memory 1025 may contain, among other things, a BIOS which may control basic hardware or software operation such as the interaction with peripheral components or devices. In some examples, the at least one processor 1035 may include multiple processors and the at least one memory 1025 may include multiple memories. One or more of the multiple processors may be coupled with one or more of the multiple memories which may, individually or collectively, be configured to perform various functions herein (for example, as part of a processing system).

The at least one processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1035 may be configured to operate a memory array using a memory controller. In some other cases, a memory controller may be integrated into one or more of the at least one processor 1035. The at least one processor 1035 may be configured to execute computer-readable instructions stored in a memory (e.g., one or more of the at least one memory 1025) to cause the device 1005 to perform various functions (e.g., functions or tasks supporting high-granularity precoder cycling with channel estimation). For example, the device 1005 or a component of the device 1005 may include at least one processor 1035 and at least one memory 1025 coupled with one or more of the at least one processor 1035, the at least one processor 1035 and the at least one memory 1025 configured to perform various functions described herein. The at least one processor 1035 may be an example of a cloud-computing platform (e.g., one or more physical nodes and supporting software such as operating systems, virtual machines, or container instances) that may host the functions (e.g., by executing code 1030) to perform the functions of the device 1005. The at least one processor 1035 may be any one or more suitable processors capable of executing scripts or instructions of one or more software programs stored in the device 1005 (such as within one or more of the at least one memory 1025). In some examples, the at least one processor 1035 may include multiple processors and the at least one memory 1025 may include multiple memories.

One or more of the multiple processors may be coupled with one or more of the multiple memories, which may, individually or collectively, be configured to perform various functions herein. In some examples, the at least one processor 1035 may be a component of a processing system, which may refer to a system (such as a series) of machines, circuitry (including, for example, one or both of processor circuitry (which may include the at least one processor 1035) and memory circuitry (which may include the at least one memory 1025)), or components, that receives or obtains inputs and processes the inputs to produce, generate, or obtain a set of outputs. The processing system may be configured to perform one or more of the functions described herein. As such, the at least one processor 1035 or a processing system including the at least one processor 1035 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1025 or otherwise, to perform one or more of the functions described herein.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the at least one memory 1025, the code 1030, and the at least one processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105 and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communications in accordance with examples as disclosed herein. For example, the communications manager 1020 is capable of, configured to, or operable to support a means for transmitting, via a first beam, first representations of a first symbol of a space-frequency block coded symbol pair using first resources of a set of multiple resources and first representations of a second symbol of the space-frequency block coded symbol pair using second resources of the set of multiple resources, where the set of multiple resources are a set of multiple time and frequency resources. The communications manager 1020 is capable of, configured to, or operable to support a means for transmitting, via a second beam, second representations of the first symbol using the second resources and second representations of the second symbol using the first resources of the set of multiple resources, where across the set of multiple resources, the first beam, and the second beam, each representation of the first symbol and each representation of the second symbol is precoded by a different respective precoder of a set of multiple precoders.

By including or configuring the communications manager 1020 in accordance with examples as described herein, the device 1005 may support techniques for performing precoder cycling with increased-efficiency resource block allocation and with reduced effect on channel estimation.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. For example, the communications manager 1020 may be configured to receive or transmit messages or other signaling as described herein via the transceiver 1010. Although the communications manager 1020 is illustrated as a separate component, in some examples, one or more functions described with reference to the communications manager 1020 may be supported by or performed by the transceiver 1010, one or more of the at least one processor 1035, one or more of the at least one memory 1025, the code 1030, or any combination thereof (for example, by a processing system including at least a portion of the at least one processor 1035, the at least one memory 1025, the code 1030, or any combination thereof). For example, the code 1030 may include instructions executable by one or more of the at least one processor 1035 to cause the device 1005 to perform various aspects of high-granularity precoder cycling with channel estimation as described herein, or the at least one processor 1035 and the at least one memory 1025 may be otherwise configured to, individually or collectively, perform or support such operations.

Figure 11:
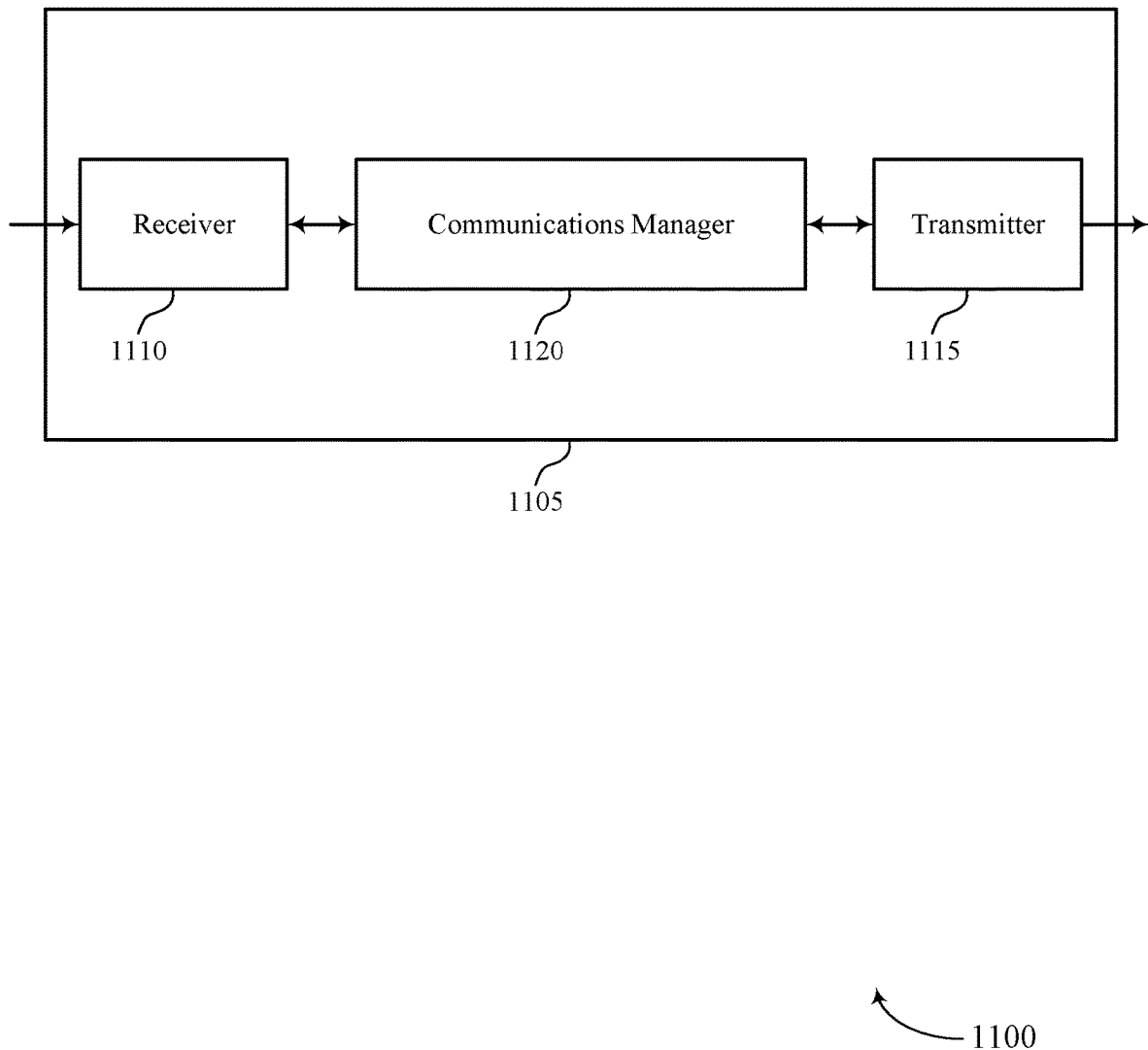
FIGS. 11 and 12 show block diagrams of devices that support high-granularity precoder cycling with channel estimation in accordance with one or more aspects of the present disclosure.

FIG. 11 shows a block diagram 1100 of a device 1105 that supports high-granularity precoder cycling with channel estimation in accordance with one or more aspects of the present disclosure. The device 1105 may be an example of aspects of a UE 115 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to, individually or collectively, support or enable the described techniques. Each of these components may be in communication with one another (e.g., via one or more buses).

The receiver 1110 may provide a means for receiving information such as packets, user data, control information, or any combination thereof associated with various information channels (e.g., control channels, data channels, information channels related to high-granularity precoder cycling with channel estimation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to high-granularity precoder cycling with channel estimation). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of high-granularity precoder cycling with channel estimation as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. For example, the communications manager 1120 is capable of, configured to, or operable to support a means for receiving first representations of a first symbol of a space-frequency block coded symbol pair using first resources of a set of multiple resources and first representations of a second symbol of the space-frequency block coded symbol pair using second resources of the set of multiple resources, the first representations of the first symbol and the first representations of the second symbol being transmitted via a first beam, where the set of multiple resources are a set of multiple time and frequency resources. The communications manager 1120 is capable of, configured to, or operable to support a means for receiving second representations of the first symbol using the second resources and second representations of the second symbol using the first resources of the set of multiple resources, the second representations of the first symbol and the second representations of the second symbol being transmitted via a second beam, where across the set of multiple resources, the first beam, and the second beam, each representation of the first symbol and each representation of the second symbol is precoded by a different respective precoder of a set of multiple precoders.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for performing precoder cycling with increased-efficiency resource block allocation and with reduced effect on channel estimation.

Figure 12:
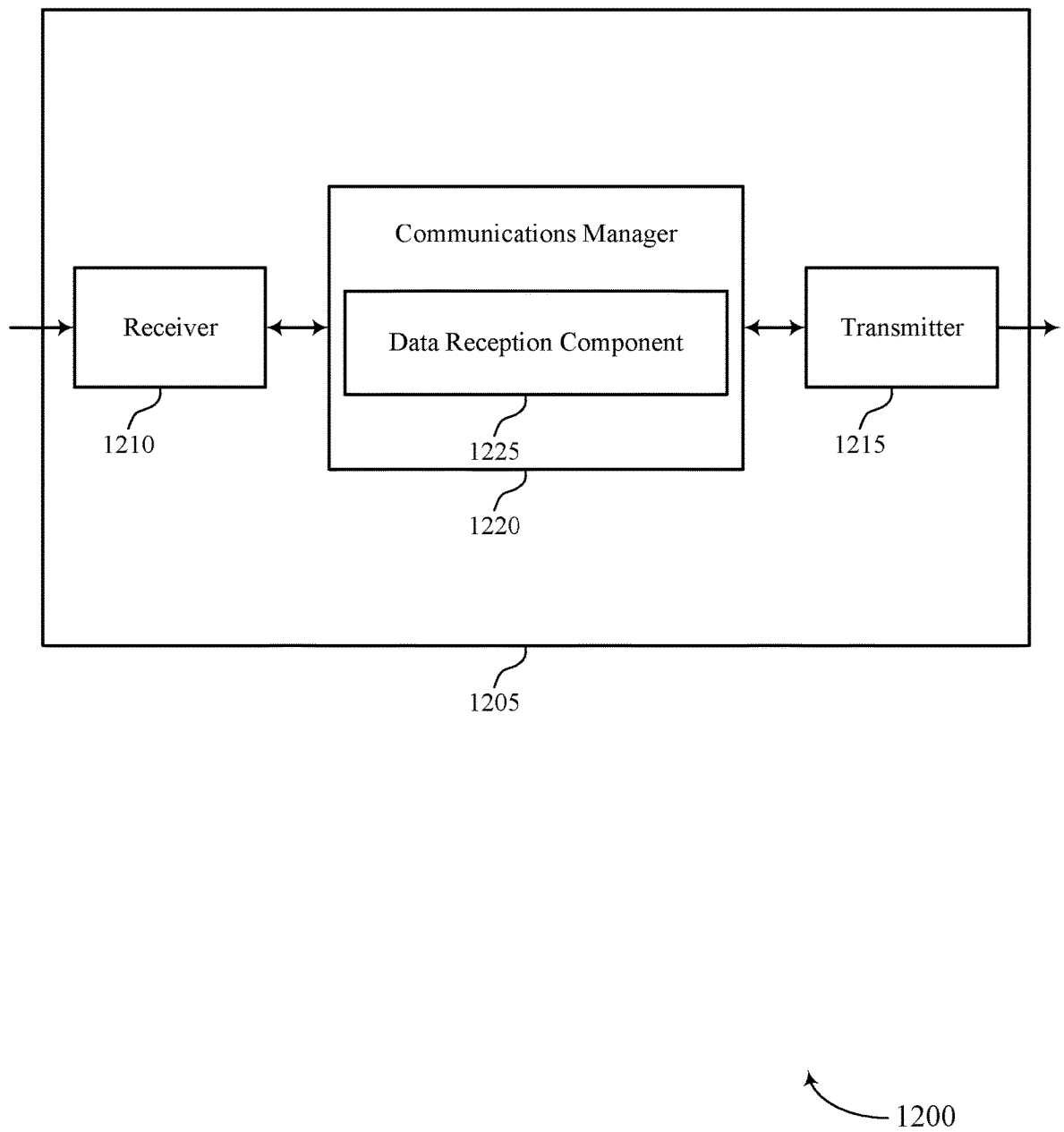

FIG. 12 shows a block diagram 1200 of a device 1205 that supports high-granularity precoder cycling with channel estimation in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205, or one of more components of the device 1205 (e.g., the receiver 1210, the transmitter 1215, and the communications manager 1220), may include at least one processor, which may be coupled with at least one memory, to support the described techniques. Each of these components may be in communication with one another (e.g., via one or more buses).

The receiver 1210 may provide a means for receiving information such as packets, user data, control information, or any combination thereof associated with various information channels (e.g., control channels, data channels, information channels related to high-granularity precoder cycling with channel estimation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to high-granularity precoder cycling with channel estimation). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of high-granularity precoder cycling with channel estimation as described herein. For example, the communications manager 1220 may include a data reception component 1225, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. The data reception component 1225 is capable of, configured to, or operable to support a means for receiving first representations of a first symbol of a space-frequency block coded symbol pair using first resources of a set of multiple resources and first representations of a second symbol of the space-frequency block coded symbol pair using second resources of the set of multiple resources, the first representations of the first symbol and the first representations of the second symbol being transmitted via a first beam, where the set of multiple resources are a set of multiple time and frequency resources. The data reception component 1225 is capable of, configured to, or operable to support a means for receiving second representations of the first symbol using the second resources and second representations of the second symbol using the first resources of the set of multiple resources, the second representations of the first symbol and the second representations of the second symbol being transmitted via a second beam, where across the set of multiple resources, the first beam, and the second beam, each representation of the first symbol and each representation of the second symbol is precoded by a different respective precoder of a set of multiple precoders.

Figure 13:
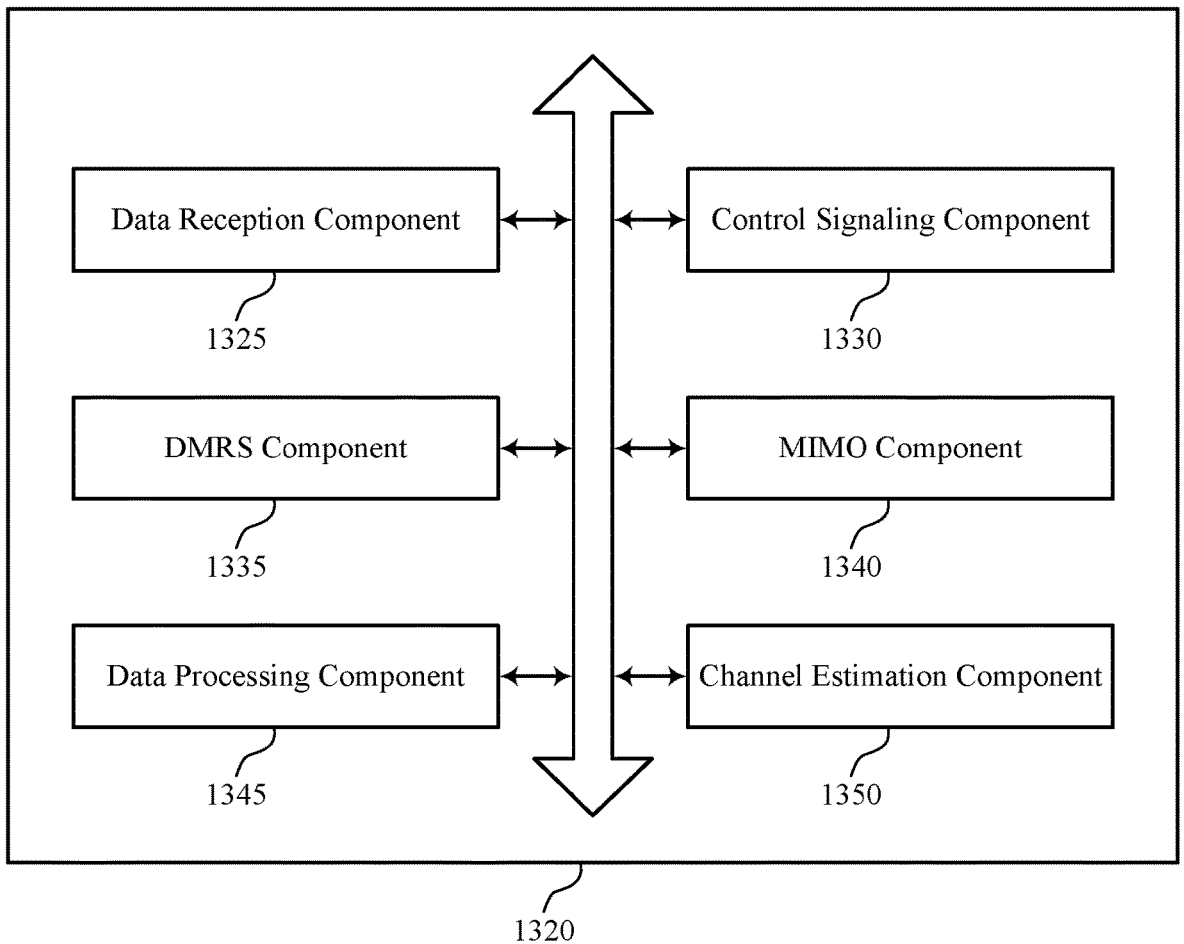
FIG. 13 shows a block diagram of a communications manager that supports high-granularity precoder cycling with channel estimation in accordance with one or more aspects of the present disclosure.

FIG. 13 shows a block diagram 1300 of a communications manager 1320 that supports high-granularity precoder cycling with channel estimation in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of high-granularity precoder cycling with channel estimation as described herein. For example, the communications manager 1320 may include a data reception component 1325, a control signaling component 1330, a DMRS component 1335, a MIMO component 1340, a data processing component 1345, a channel estimation component 1350, or any combination thereof. Each of these components, or components or subcomponents thereof (e.g., one or more processors, one or more memories), may communicate, directly or indirectly, with one another (e.g., via one or more buses).

The communications manager 1320 may support wireless communications in accordance with examples as disclosed herein. The data reception component 1325 is capable of, configured to, or operable to support a means for receiving first representations of a first symbol of a space-frequency block coded symbol pair using first resources of a set of multiple resources and first representations of a second symbol of the space-frequency block coded symbol pair using second resources of the set of multiple resources, the first representations of the first symbol and the first representations of the second symbol being transmitted via a first beam, where the set of multiple resources are a set of multiple time and frequency resources. In some examples, the data reception component 1325 is capable of, configured to, or operable to support a means for receiving second representations of the first symbol using the second resources and second representations of the second symbol using the first resources of the set of multiple resources, the second representations of the first symbol and the second representations of the second symbol being transmitted via a second beam, where across the set of multiple resources, the first beam, and the second beam, each representation of the first symbol and each representation of the second symbol is precoded by a different respective precoder of a set of multiple precoders.

In some examples, the control signaling component 1330 is capable of, configured to, or operable to support a means for receiving an indication of a correspondence between each precoder of the set of multiple precoders and each resource of the set of multiple resources.

In some examples, the DMRS component 1335 is capable of, configured to, or operable to support a means for receiving a first set of multiple demodulation reference signals using a second set of multiple resources, the first set of multiple demodulation reference signals being transmitted via the first beam, where a bandwidth of the second plurality of resources is larger than a bandwidth of the first set of multiple resources. In some examples, the DMRS component 1335 is capable of, configured to, or operable to support a means for receiving a second set of multiple demodulation reference signals using the second set of multiple resources or a third set of multiple resources, the second set of multiple demodulation reference signals being transmitted via the second beam, where a bandwidth of the third set of multiple resources is larger than the bandwidth of the first set of multiple resources.

In some examples, a first demodulation reference signal of the first set of multiple demodulation reference signals is associated with a first demodulation reference signal port that corresponds to the first beam and a first polarization, a second demodulation reference signal of the first set of multiple demodulation reference signals is associated with a second demodulation reference signal port that corresponds to the first beam and a second polarization, a first demodulation reference signal of the second set of multiple demodulation reference signals is associated with a third demodulation reference signal port that corresponds to the second beam and the first polarization, and a second demodulation reference signal of the second set of multiple demodulation reference signals is associated with a fourth demodulation reference signal port that corresponds to the second beam and the second polarization.

In some examples, the channel estimation component 1350 is capable of, configured to, or operable to support a means for estimating, based on the first demodulation reference signal of the first set of multiple demodulation reference signals and the first demodulation reference signal of the second set of multiple demodulation reference signals, a first polarized component of a channel between the wireless device and a second wireless device. In some examples, the channel estimation component 1350 is capable of, configured to, or operable to support a means for estimating, based on the second demodulation reference signal of the first set of multiple demodulation reference signals and the second demodulation reference signal of the second set of multiple demodulation reference signals, a second polarized component of the channel.

In some examples, the MIMO component 1340 is capable of, configured to, or operable to support a means for receiving a multiple-input, multiple-output signal based on receiving the first representations of the first symbol, the first representations of the second symbol, the second representations of the first symbol, and the second representations of the second symbol. In some examples, the data processing component 1345 is capable of, configured to, or operable to support a means for combining a set of multiple instances of the first symbol received in the multiple-input, multiple-output signal to obtain a diversity-combined first symbol. In some examples, the data processing component 1345 is capable of, configured to, or operable to support a means for combining a set of multiple instances of the second symbol received in the multiple-input, multiple-output signal to obtain a diversity-combined second symbol.

Figure 14:
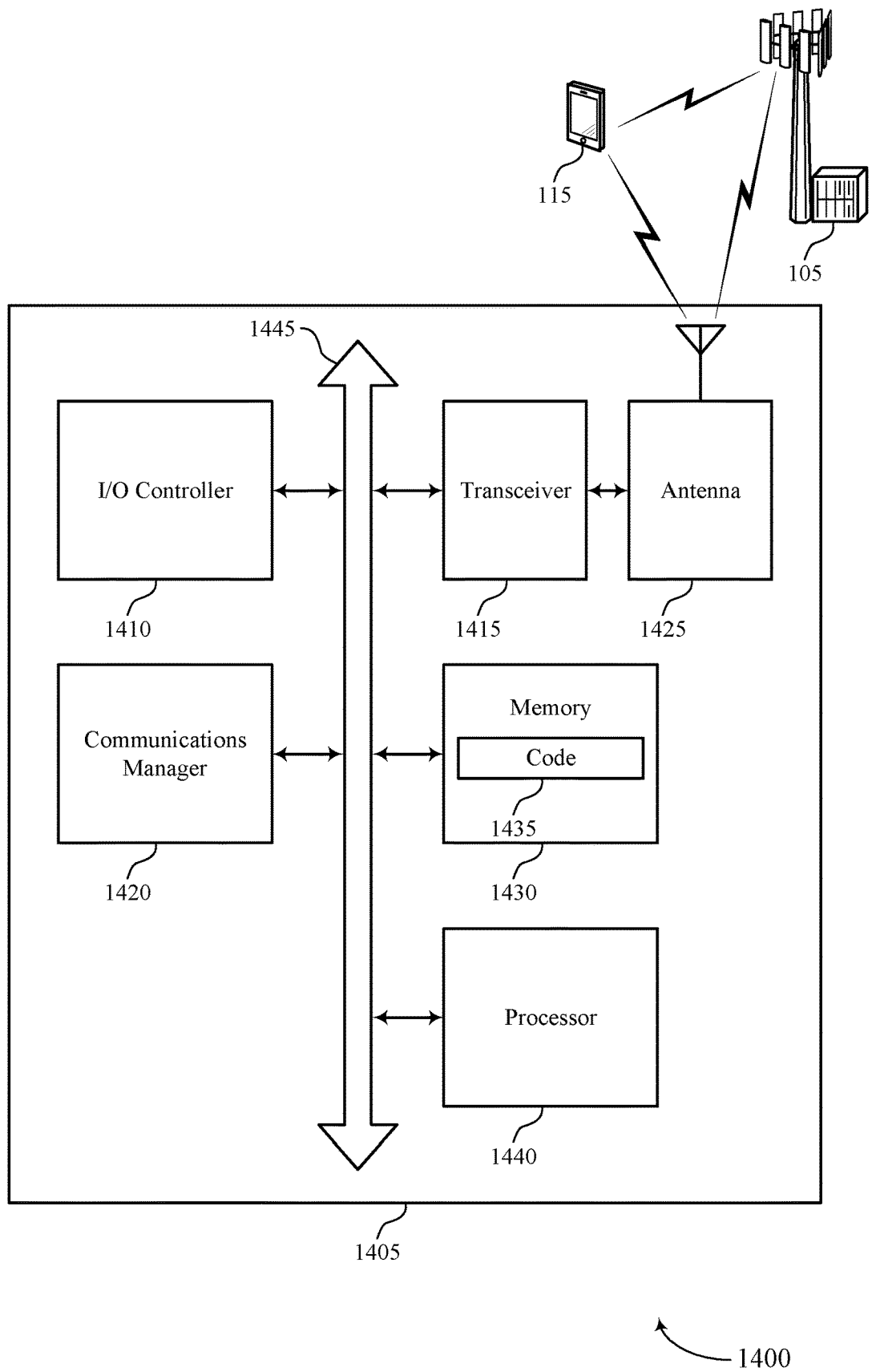
FIG. 14 shows a diagram of a system including a device that supports high-granularity precoder cycling with channel estimation in accordance with one or more aspects of the present disclosure.

FIG. 14 shows a diagram of a system 1400 including a device 1405 that supports high-granularity precoder cycling with channel estimation in accordance with one or more aspects of the present disclosure. The device 1405 may be an example of or include the components of a device 1105, a device 1205, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, at least one memory 1430, code 1435, and at least one processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of one or more processors, such as the at least one processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The at least one memory 1430 may include random access memory (RAM) and read-only memory (ROM). The at least one memory 1430 may store computer-readable, computer-executable code 1435 including instructions that, when executed by the at least one processor 1440, cause the device 1405 to perform various functions described herein. The code 1435 may be stored in a non-transitory computer-readable medium such as system memory or another type of memory. In some cases, the code 1435 may not be directly executable by the at least one processor 1440 but may cause a computer (e.g., when compiled and executed) to perform functions described herein. In some cases, the at least one memory 1430 may contain, among other things, a basic I/O system (BIOS) which may control basic hardware or software operation such as the interaction with peripheral components or devices.

The at least one processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1440 may be configured to operate a memory array using a memory controller. In some other cases, a memory controller may be integrated into the at least one processor 1440. The at least one processor 1440 may be configured to execute computer-readable instructions stored in a memory (e.g., the at least one memory 1430) to cause the device 1405 to perform various functions (e.g., functions or tasks supporting high-granularity precoder cycling with channel estimation). For example, the device 1405 or a component of the device 1405 may include at least one processor 1440 and at least one memory 1430 coupled with or to the at least one processor 1440, the at least one processor 1440 and at least one memory 1430 configured to perform various functions described herein. In some examples, the at least one processor 1440 may include multiple processors and the at least one memory 1430 may include multiple memories. One or more of the multiple processors may be coupled with one or more of the multiple memories, which may, individually or collectively, be configured to perform various functions herein. In some examples, the at least one processor 1440 may be a component of a processing system, which may refer to a system (such as a series) of machines, circuitry (including, for example, one or both of processor circuitry (which may include the at least one processor 1440) and memory circuitry (which may include the at least one memory 1430)), or components, that receives or obtains inputs and processes the inputs to produce, generate, or obtain a set of outputs. The processing system may be configured to perform one or more of the functions described herein. As such, the at least one processor 1440 or a processing system including the at least one processor 1440 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1430 or otherwise, to perform one or more of the functions described herein.

The communications manager 1420 may support wireless communications in accordance with examples as disclosed herein. For example, the communications manager 1420 is capable of, configured to, or operable to support a means for receiving first representations of a first symbol of a space-frequency block coded symbol pair using first resources of a set of multiple resources and first representations of a second symbol of the space-frequency block coded symbol pair using second resources of the set of multiple resources, the first representations of the first symbol and the first representations of the second symbol being transmitted via a first beam, where the set of multiple resources are a set of multiple time and frequency resources. The communications manager 1420 is capable of, configured to, or operable to support a means for receiving second representations of the first symbol using the second resources and second representations of the second symbol using the first resources of the set of multiple resources, the second representations of the first symbol and the second representations of the second symbol being transmitted via a second beam, where across the set of multiple resources, the first beam, and the second beam, each representation of the first symbol and each representation of the second symbol is precoded by a different respective precoder of a set of multiple precoders.

By including or configuring the communications manager 1420 in accordance with examples as described herein, the device 1405 may support techniques for performing precoder cycling with increased-efficiency resource block allocation and with reduced effect on channel estimation.

In some examples, the communications manager 1420 may be configured to perform various operations (e.g., receiving, monitoring, transmitting) using or otherwise in cooperation with the transceiver 1415, the one or more antennas 1425, or any combination thereof. For example, the communications manager 1420 may be configured to receive or transmit messages or other signaling as described herein via the transceiver 1415. Although the communications manager 1420 is illustrated as a separate component, in some examples, one or more functions described with reference to the communications manager 1420 may be supported by or performed by the at least one processor 1440, the at least one memory 1430, the code 1435, or any combination thereof. For example, the code 1435 may include instructions executable by the at least one processor 1440 to cause the device 1405 to perform various aspects of high-granularity precoder cycling with channel estimation as described herein, or the at least one processor 1440 and the at least one memory 1430 may be otherwise configured to, individually or collectively, perform or support such operations.

Figure 15:
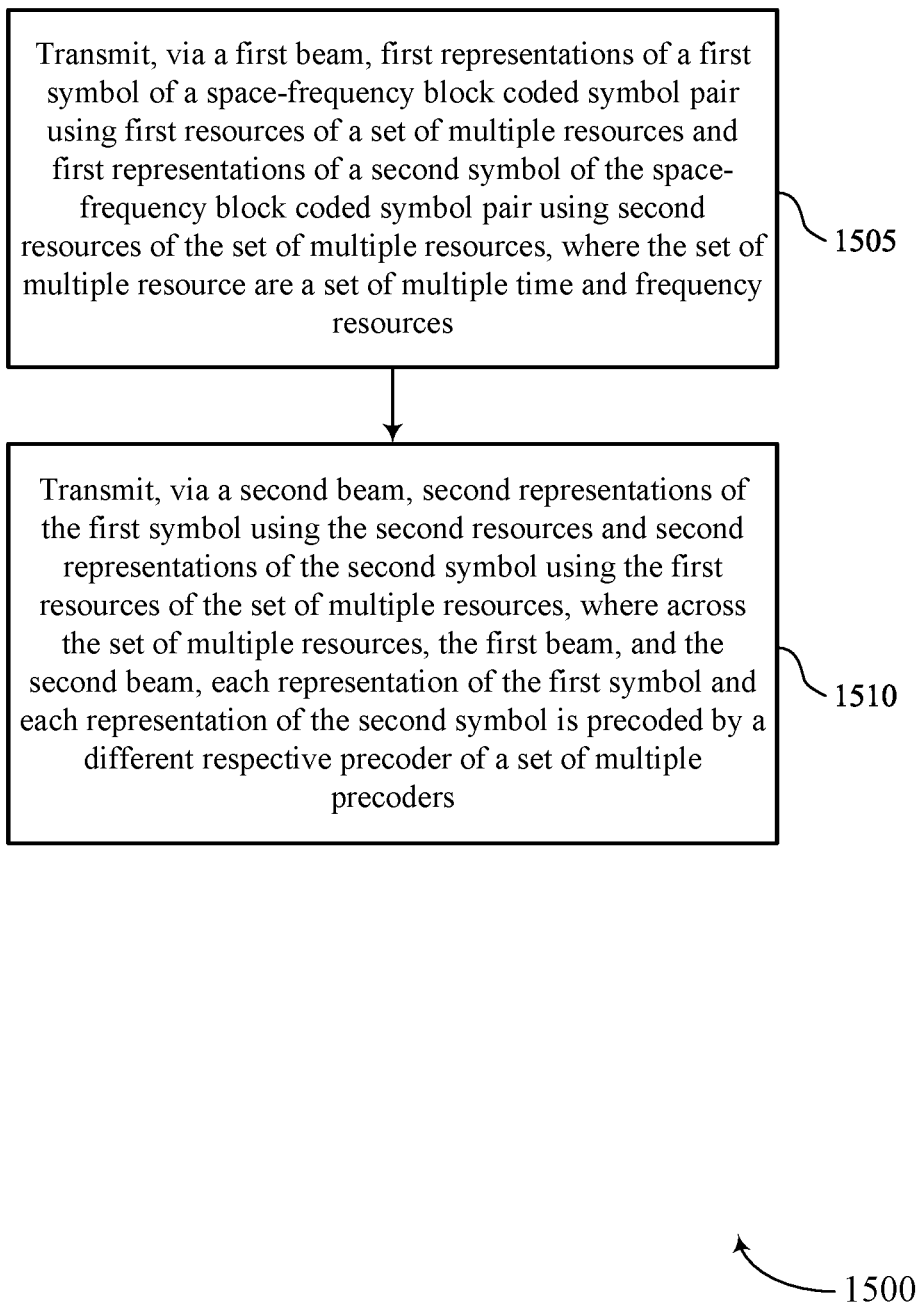
FIGS. 15 and 16 show flowcharts illustrating methods that support high-granularity precoder cycling with channel estimation in accordance with one or more aspects of the present disclosure.

FIG. 15 shows a flowchart illustrating a method 1500 that supports high-granularity precoder cycling with channel estimation in accordance with aspects of the present disclosure. The operations of the method 1500 may be implemented by a network entity or its components as described herein. For example, the operations of the method 1500 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, via a first beam, first representations of a first symbol of a space-frequency block coded symbol pair using first resources of a set of multiple resources and first representations of a second symbol of the space-frequency block coded symbol pair using second resources of the set of multiple resources, where the set of multiple resources are a set of multiple time and frequency resources. The operations of 1505 may be performed in accordance with examples as disclosed herein. In some examples, aspects of the operations of 1505 may be performed by a first beam component 925 as described with reference to FIG. 9. Additionally, or alternatively, means for performing 1505 may, but not necessarily, include, for example, the antenna 1015, the transceiver 1010, the communications manager 1020, the memory 1025 (including the code 1030), the processor 1035, and/or the bus 1040.

At 1510, the method may include transmitting, via a second beam, second representations of the first symbol using the second resources and second representations of the second symbol using the first resources of the set of multiple resources, where across the set of multiple resources, the first beam, and the second beam, each representation of the first symbol and each representation of the second symbol is precoded by a different respective precoder of a set of multiple precoders. The operations of 1510 may be performed in accordance with examples as disclosed herein. In some examples, aspects of the operations of 1510 may be performed by a second beam component 930 as described with reference to FIG. 9. In some examples, aspects of the operations of 1505 may be performed by a first beam component 925 as described with reference to FIG. 9. Additionally, or alternatively, means for performing 1510 may, but not necessarily, include, for example, the antenna 1015, the transceiver 1010, the communications manager 1020, the memory 1025 (including the code 1030), the processor 1035, and/or the bus 1040.

Figure 16:
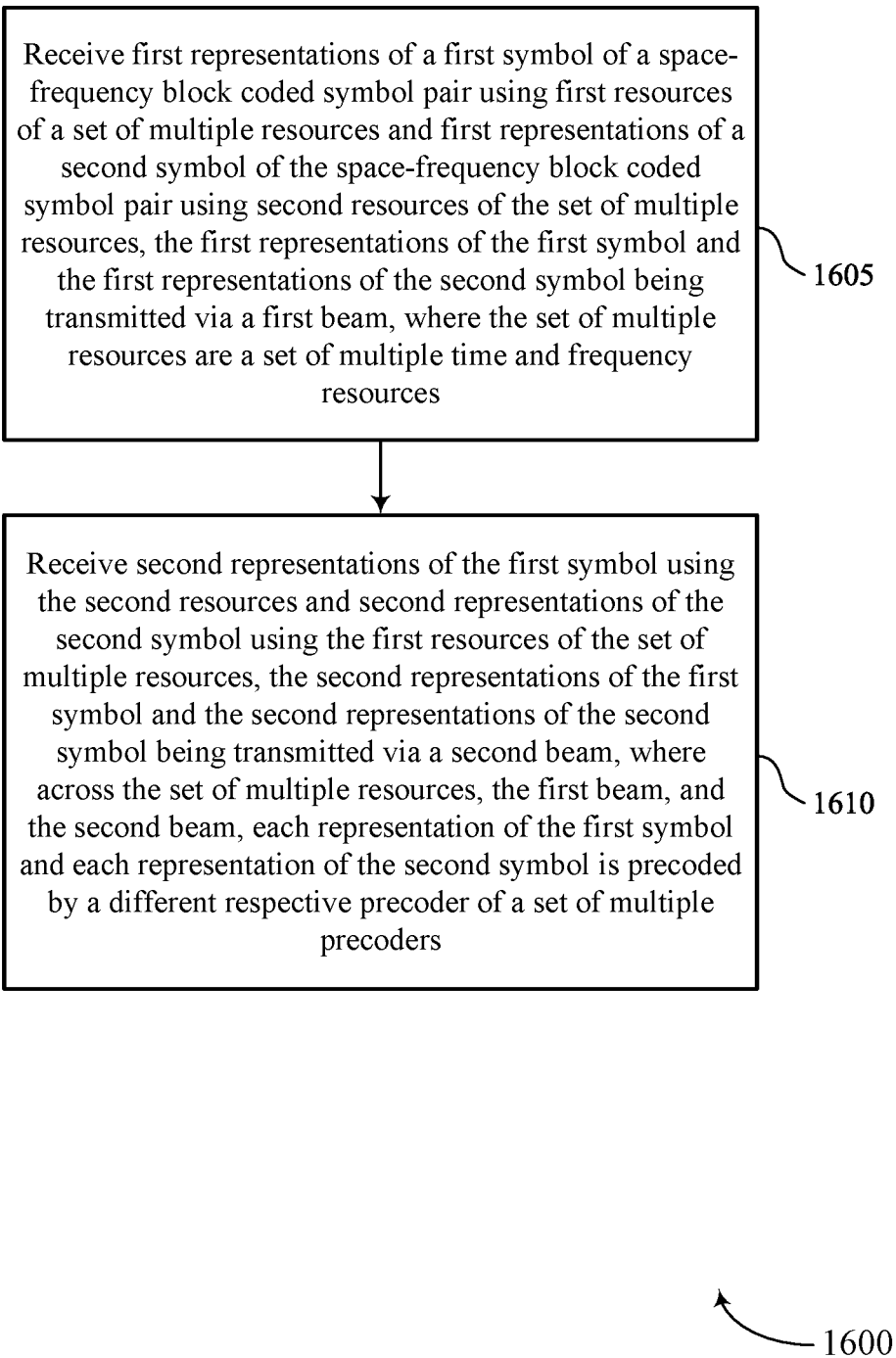

FIG. 16 shows a flowchart illustrating a method 1600 that supports high-granularity precoder cycling with channel estimation in accordance with aspects of the present disclosure. The operations of the method 1600 may be implemented by a UE or its components as described herein. For example, the operations of the method 1600 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1605, the method may include receiving first representations of a first symbol of a space-frequency block coded symbol pair using first resources of a set of multiple resources and first representations of a second symbol of the space-frequency block coded symbol pair using second resources of the set of multiple resources, the first representations of the first symbol and the first representations of the second symbol being transmitted via a first beam, where the set of multiple resources are a set of multiple time and frequency resources. The operations of 1605 may be performed in accordance with examples as disclosed herein. In some examples, aspects of the operations of 1605 may be performed by a data reception component 1325 as described with reference to FIG. 13. In some examples, aspects of the operations of 1505 may be performed by a first beam component 925 as described with reference to FIG. 9. Additionally, or alternatively, means for performing 1605 may, but not necessarily, include, for example, the antenna 1425, the transceiver 1415, the communications manager 1420, the memory 1430 (including the code 1435), the processor 1440, and/or the bus 1445.

At 1610, the method may include receiving second representations of the first symbol using the second resources and second representations of the second symbol using the first resources of the set of multiple resources, the second representations of the first symbol and the second representations of the second symbol being transmitted via a second beam, where across the set of multiple resources, the first beam, and the second beam, each representation of the first symbol and each representation of the second symbol is precoded by a different respective precoder of a set of multiple precoders. The operations of 1610 may be performed in accordance with examples as disclosed herein. In some examples, aspects of the operations of 1610 may be performed by a data reception component 1325 as described with reference to FIG. 13. In some examples, aspects of the operations of 1610 may be performed by a first beam component 925 as described with reference to FIG. 9.

Additionally, or alternatively, means for performing 1610 may, but not necessarily, include, for example, the antenna 1425, the transceiver 1415, the communications manager 1420, the memory 1430 (including the code 1435), the processor 1440, and/or the bus 1445.

The following provides an overview of aspects of the present disclosure:

Aspect 1: A method for wireless communications at a wireless device, comprising: transmitting, via a first beam, first representations of a first symbol of a space-frequency block coded symbol pair using first resources of a plurality of resources and first representations of a second symbol of the space-frequency block coded symbol pair using second resources of the plurality of resources, wherein the plurality of resources are a plurality of time and frequency resources; and transmitting, via a second beam, second representations of the first symbol using the second resources and second representations of the second symbol using the first resources of the plurality of resources, wherein across the plurality of resources, the first beam, and the second beam, each representation of the first symbol and each representation of the second symbol is precoded by a different respective precoder of a plurality of precoders.

Aspect 2: The method of aspect 1, further comprising: signaling, to a second wireless device, an indication of a correspondence between each precoder of the plurality of precoders and each resource of the plurality of resources.

Aspect 3: The method of any of aspects 1 through 2, further comprising: mapping the first representations of the first symbol to the first resources and the second representations of the first symbol to the second resources; applying, based at least in part on the mapping, a first set of precoders of the plurality of precoders to the first resources, wherein the first set of precoders are used for transmissions via the first beam, and wherein respective phases of the first set of precoders are offset from one another; and applying, based at least in part on the mapping, a second set of precoders of the plurality of precoders to the second resources, wherein the second set of precoders are used for transmissions via the second beam, and wherein respective phases of the second set of precoders are offset from one another.

Aspect 4: The method of aspect 3, further comprising: cycling a phase of a first precoder to obtain a first plurality of cycled precoders, wherein the first set of precoders comprises the first plurality of cycled precoders; and cycling a phase of a second precoder to obtain a second plurality of cycled precoders, wherein the second set of precoders comprises the second plurality of cycled precoders.

Aspect 5: The method of any of aspects 1 through 4, further comprising: transmitting, via the first beam, a first plurality of demodulation reference signals using a second plurality of resources, wherein a bandwidth of the second plurality of resources is larger than a bandwidth of the plurality of resources; and transmitting, via the second beam, a second plurality of demodulation reference signals using a third plurality of resources, wherein a bandwidth of the third plurality of resources is larger than the bandwidth of the plurality of resources.

Aspect 6: The method of aspect 5, wherein a first demodulation reference signal of the first plurality of demodulation reference signals is transmitted via a first demodulation reference signal port that corresponds to the first beam and a first polarization, a second demodulation reference signal of the first plurality of demodulation reference signals is transmitted via a second demodulation reference signal port that corresponds to the first beam and a second polarization, a first demodulation reference signal of the second plurality of demodulation reference signals is transmitted via a third demodulation reference signal port that corresponds to the second beam and the first polarization, and a second demodulation reference signal of the second plurality of demodulation reference signals is transmitted via a fourth demodulation reference signal port that corresponds to the second beam and the second polarization.

Aspect 7: The method of aspect 6, wherein the first demodulation reference signal of the first plurality of demodulation reference signals and the first demodulation reference signal of the second plurality of demodulation reference signals are associated with an estimate of a first polarized component of a channel between the wireless device and a second wireless device, and the second demodulation reference signal of the first plurality of demodulation reference signals and the second demodulation reference signal of the second plurality of demodulation reference signals are associated with an estimate of a second polarized component of the channel.

Aspect 8: The method of any of aspects 1 through 7, wherein a multiple-input, multiple-output signal is transmitted from the wireless device to a second wireless device based at least in part on transmitting the first representations of the first symbol, the first representations of the second symbol, the second representations of the first symbol, and the second representations of the second symbol, and the first representations of the first symbol, the second representations of the first symbol, the first representations of the second symbol, and the second representations of the second symbol enable diversity combining of the first symbol and the second symbol at the second wireless device.

Aspect 9: The method of any of aspects 1 through 8, wherein a first antenna panel of the wireless device comprises a first set of antennas and is associated with a first set of antenna ports, and a second antenna panel of the wireless device comprises a second set of antennas and is associated with a second set of antenna ports.

Aspect 10: The method of any of aspects 1 through 9, further comprising: encoding a stream of data symbols using a spatial frequency block coding scheme to obtain a stream of space-frequency block coded symbol pairs comprising the space-frequency block coded symbol pair that comprises the first symbol and the second symbol; and mapping, based at least in part on the encoding, a first representation of the first symbol to each resource of the first resources and a first representation of the second symbol to each resource of the second resources, and a second representation of the first symbol to each resource of the second resources and a second representation of the second symbol to each resource of the first resources, wherein the first representations of the first symbol, the second representations of the first symbol, the first representations of the second symbol, and the second representations of the second symbol are transmitted based at least in part on the mapping.

Aspect 11: The method of any of aspects 1 through 10, wherein across the first beam and the second beam, each representation of the first symbol is conveyed via a respective resource of the plurality of resources, across the first beam and the second beam, each representation of the second symbol is conveyed via a respective resource of the plurality of resources, and each resource of the plurality of resources is a resource element or a resource block.

Aspect 12: A method for wireless communications at a wireless device, comprising: receiving first representations of a first symbol of a space-frequency block coded symbol pair using first resources of a plurality of resources and first representations of a second symbol of the space-frequency block coded symbol pair using second resources of the plurality of resources, the first representations of the first symbol and the first representations of the second symbol being transmitted via a first beam, wherein the plurality of resources are a plurality of time and frequency resources; and receiving second representations of the first symbol using the second resources and second representations of the second symbol using the first resources of the plurality of resources, the second representations of the first symbol and the second representations of the second symbol being transmitted via a second beam, wherein across the plurality of resources, the first beam, and the second beam, each representation of the first symbol and each representation of the second symbol is precoded by a different respective precoder of a plurality of precoders.

Aspect 13: The method of aspect 12, further comprising: receiving an indication of a correspondence between each precoder of the plurality of precoders and each resource of the plurality of resources.

Aspect 14: The method of any of aspects 12 through 13, further comprising: receiving a first plurality of demodulation reference signals using a second plurality of resources, the first plurality of demodulation reference signals being transmitted via the first beam, wherein a bandwidth of the second plurality of resources is larger than a bandwidth of the plurality of resources; and receiving a second plurality of demodulation reference signals using the second plurality of resources or a third plurality of resources, the second plurality of demodulation reference signals being transmitted via the second beam, wherein a bandwidth of the third plurality of resources is larger than the bandwidth of the plurality of resources.

Aspect 15: The method of aspect 14, wherein a first demodulation reference signal of the first plurality of demodulation reference signals is associated with a first demodulation reference signal port that corresponds to the first beam and a first polarization, a second demodulation reference signal of the first plurality of demodulation reference signals is associated with a second demodulation reference signal port that corresponds to the first beam and a second polarization, a first demodulation reference signal of the second plurality of demodulation reference signals is associated with a third demodulation reference signal port that corresponds to the second beam and the first polarization, and a second demodulation reference signal of the second plurality of demodulation reference signals is associated with a fourth demodulation reference signal port that corresponds to the second beam and the second polarization.

Aspect 16: The method of aspect 15, further comprising: estimating, based at least in part on the first demodulation reference signal of the first plurality of demodulation reference signals and the first demodulation reference signal of the second plurality of demodulation reference signals, a first polarized component of a channel between the wireless device and a second wireless device; and estimating, based at least in part on the second demodulation reference signal of the first plurality of demodulation reference signals and the second demodulation reference signal of the second plurality of demodulation reference signals, a second polarized component of the channel.

Aspect 17: The method of any of aspects 12 through 16, further comprising: receiving a multiple-input, multiple-output signal based at least in part on receiving the first representations of the first symbol, the first representations of the second symbol, the second representations of the first symbol, and the second representations of the second symbol; combining a plurality of instances of the first symbol received in the multiple-input, multiple-output signal to obtain a diversity-combined first symbol; and combining a plurality of instances of the second symbol received in the multiple-input, multiple-output signal to obtain a diversity-combined second symbol.

Aspect 18: An apparatus comprising a memory and at least one processor coupled with the memory, the at least one processor configured to perform a method of any of aspects 1 through 11.

Aspect 19: An apparatus for wireless communications, comprising at least one means for performing a method of any of aspects 1 through 11.

Aspect 20: A non-transitory computer-readable medium storing code for wireless communications, the code comprising instructions executable by a processor to perform a method of any of aspects 1 through 11.

Aspect 21: An apparatus comprising a memory, transceiver, and at least one processor coupled with the memory and the transceiver, the at least one processor configured to perform a method of any of aspects 12 through 17.

Aspect 22: An apparatus for wireless communications, comprising at least one means for performing a method of any of aspects 12 through 17.

Aspect 23: A non-transitory computer-readable medium storing code for wireless communications, the code comprising instructions executable by a processor to perform a method of any of aspects 12 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications, comprising:
   memory;
   a transceiver; and
   at least one processor of a user equipment (UE), the at least one processor coupled with the memory and the transceiver and configured to:
   receive, via the transceiver, first representations of a first symbol of a space-frequency block coded symbol pair using first resources of a plurality of resources and first representations of a second symbol of the space-frequency block coded symbol pair using second resources of the plurality of resources, the first representations of the first symbol and the first representations of the second symbol being transmitted via a first beam, wherein the plurality of resources are a plurality of time and frequency resources; and
   receive, via the transceiver, second representations of the first symbol using the second resources and second representations of the second symbol using the first resources of the plurality of resources, the second representations of the first symbol and the second representations of the second symbol being transmitted via a second beam,
   wherein across the plurality of resources, the first beam, and the second beam, each representation of the first symbol and each representation of the second symbol is precoded by a different respective precoder of a plurality of precoders.

2. The apparatus of claim 1, the at least one processor configured to:
   receive, via the transceiver, an indication of a correspondence between each precoder of the plurality of precoders and each resource of the plurality of resources.

3. The apparatus of claim 1, the at least one processor configured to:
   receive, via the transceiver, a first plurality of demodulation reference signals using a second plurality of resources, the first plurality of demodulation reference signals being transmitted via the first beam, wherein a bandwidth of the second plurality of resources is larger than a bandwidth of the plurality of resources; and
   receive, via the transceiver, a second plurality of demodulation reference signals using the second plurality of resources or a third plurality of resources, the second plurality of demodulation reference signals being transmitted via the second beam, wherein a bandwidth of the third plurality of resources is larger than the bandwidth of the plurality of resources.

4. The apparatus of claim 3, wherein:
   a first demodulation reference signal of the first plurality of demodulation reference signals is associated with a first demodulation reference signal port that corresponds to the first beam and a first polarization,
   a second demodulation reference signal of the first plurality of demodulation reference signals is associated with a second demodulation reference signal port that corresponds to the first beam and a second polarization,
   a first demodulation reference signal of the second plurality of demodulation reference signals is associated with a third demodulation reference signal port that corresponds to the second beam and the first polarization, and
   a second demodulation reference signal of the second plurality of demodulation reference signals is associated with a fourth demodulation reference signal port that corresponds to the second beam and the second polarization.

5. The apparatus of claim 4, the at least one processor configured to:
   estimate, based at least in part on the first demodulation reference signal of the first plurality of demodulation reference signals and the first demodulation reference signal of the second plurality of demodulation reference signals, a first polarized component of a channel between the UE and a second wireless device; and
   estimate, based at least in part on the second demodulation reference signal of the first plurality of demodulation reference signals and the second demodulation reference signal of the second plurality of demodulation reference signals, a second polarized component of the channel.

6. The apparatus of claim 1, the at least one processor configured to:
   receive, via the transceiver, a multiple-input, multiple-output signal based at least in part on receiving the first representations of the first symbol, the first representations of the second symbol, the second representations of the first symbol, and the second representations of the second symbol;
   combine a plurality of instances of the first symbol received in the multiple-input, multiple-output signal to obtain a diversity-combined first symbol; and
   combine a plurality of instances of the second symbol received in the multiple-input, multiple-output signal to obtain a diversity-combined second symbol.

7. An apparatus for wireless communications, comprising:
   memory; and
   at least one processor of a network entity, the at least one processor coupled with the memory and configured to:
   transmit, via a first beam, first representations of a first symbol of a space-frequency block coded symbol pair using first resources of a plurality of resources and first representations of a second symbol of the space-frequency block coded symbol pair using second resources of the plurality of resources, wherein the plurality of resources are a plurality of time and frequency resources; and
   transmit, via a second beam, second representations of the first symbol using the second resources and second representations of the second symbol using the first resources of the plurality of resources,
   wherein across the plurality of resources, the first beam, and the second beam, each representation of the first symbol and each representation of the second symbol is precoded by a different respective precoder of a plurality of precoders.

8. The apparatus of claim 7, the at least one processor configured to:
   signal, to a second wireless device, an indication of a correspondence between each precoder of the plurality of precoders and each resource of the plurality of resources.

9. The apparatus of claim 7, the at least one processor configured to:
   map the first representations of the first symbol to the first resources and the second representations of the first symbol to the second resources;
   apply, based at least in part on the mapping, a first set of precoders of the plurality of precoders to the first resources, wherein the first set of precoders are used for transmissions via the first beam, and wherein respective phases of the first set of precoders are offset from one another; and apply, based at least in part on the mapping, a second set of precoders of the plurality of precoders to the second resources, wherein the second set of precoders are used for transmissions via the second beam, and wherein respective phases of the second set of precoders are offset from one another.

10. The apparatus of claim 9, the at least one processor configured to:
cycle a phase of a first precoder to obtain a first plurality of cycled precoders, wherein the first set of precoders comprises the first plurality of cycled precoders; and
cycle a phase of a second precoder to obtain a second plurality of cycled precoders, wherein the second set of precoders comprises the second plurality of cycled precoders.

11. The apparatus of claim 7, the at least one processor configured to:
transmit, via the first beam, a first plurality of demodulation reference signals using a second plurality of resources, wherein a bandwidth of the second plurality of resources is larger than a bandwidth of the plurality of resources; and
transmit, via the second beam, a second plurality of demodulation reference signals using a third plurality of resources, wherein a bandwidth of the third plurality of resources is larger than the bandwidth of the plurality of resources.

12. The apparatus of claim 11, wherein:
a first demodulation reference signal of the first plurality of demodulation reference signals is transmitted via a first demodulation reference signal port that corresponds to the first beam and a first polarization,
a second demodulation reference signal of the first plurality of demodulation reference signals is transmitted via a second demodulation reference signal port that corresponds to the first beam and a second polarization,
a first demodulation reference signal of the second plurality of demodulation reference signals is transmitted via a third demodulation reference signal port that corresponds to the second beam and the first polarization, and
a second demodulation reference signal of the second plurality of demodulation reference signals is transmitted via a fourth demodulation reference signal port that corresponds to the second beam and the second polarization.

13. The apparatus of claim 12, wherein:
the first demodulation reference signal of the first plurality of demodulation reference signals and the first demodulation reference signal of the second plurality of demodulation reference signals are associated with an estimate of a first polarized component of a channel between the network entity and a second wireless device, and
the second demodulation reference signal of the first plurality of demodulation reference signals and the second demodulation reference signal of the second plurality of demodulation reference signals are associated with an estimate of a second polarized component of the channel.

14. The apparatus of claim 7, wherein:
a multiple-input, multiple-output signal is transmitted from the network entity to a second wireless device based at least in part on transmitting the first representations of the first symbol, the first representations of the second symbol, the second representations of the first symbol, and the second representations of the second symbol, and
the first representations of the first symbol, the second representations of the first symbol, the first representations of the second symbol, and the second representations of the second symbol enable diversity combining of the first symbol and the second symbol at the second wireless device.

15. The apparatus of claim 7, wherein:
a first antenna panel of the network entity comprises a first set of antennas and is associated with a first set of antenna ports, and
a second antenna panel of the network entity comprises a second set of antennas and is associated with a second set of antenna ports.

16. The apparatus of claim 7, the at least one processor configured to:
encode a stream of data symbols using a spatial frequency block coding scheme to obtain a stream of space-frequency block coded symbol pairs comprising the space-frequency block coded symbol pair that comprises the first symbol and the second symbol; and
map, based at least in part on the encoding:
a first representation of the first symbol to each resource of the first resources and a first representation of the second symbol to each resource of the second resources, and
a second representation of the first symbol to each resource of the second resources and a second representation of the second symbol to each resource of the first resources,
wherein the first representations of the first symbol, the second representations of the first symbol, the first representations of the second symbol, and the second representations of the second symbol are transmitted based at least in part on the mapping.

17. The apparatus of claim 7, wherein:
across the first beam and the second beam, each representation of the first symbol is conveyed via a respective resource of the plurality of resources,
across the first beam and the second beam, each representation of the second symbol is conveyed via a respective resource of the plurality of resources, and
each resource of the plurality of resources is a resource element or a resource block.

18. A method for wireless communications at a wireless device, comprising:
receiving first representations of a first symbol of a space-frequency block coded symbol pair using first resources of a plurality of resources and first representations of a second symbol of the space-frequency block coded symbol pair using second resources of the plurality of resources, the first representations of the first symbol and the first representations of the second symbol being transmitted via a first beam, wherein the plurality of resources are a plurality of time and frequency resources; and
receiving second representations of the first symbol using the second resources and second representations of the second symbol using the first resources of the plurality of resources, the second representations of the first symbol and the second representations of the second symbol being transmitted via a second beam,
wherein across the plurality of resources, the first beam, and the second beam, each representation of the first symbol and each representation of the second symbol is precoded by a different respective precoder of a plurality of precoders.

19. The method of claim 18, further comprising:
receiving an indication of a correspondence between each precoder of the plurality of precoders and each resource of the plurality of resources.

20. The method of claim 18, further comprising:
receiving a first plurality of demodulation reference signals using a second plurality of resources, the first plurality of demodulation reference signals being transmitted via the first beam, wherein a bandwidth of the second plurality of resources is larger than a bandwidth of the plurality of resources; and
receiving a second plurality of demodulation reference signals using the second plurality of resources or a third plurality of resources, the second plurality of demodulation reference signals being transmitted via the second beam, wherein a bandwidth of the third plurality of resources is larger than the bandwidth of the plurality of resources.

21. The method of claim 20, wherein:
a first demodulation reference signal of the first plurality of demodulation reference signals is associated with a first demodulation reference signal port that corresponds to the first beam and a first polarization,
a second demodulation reference signal of the first plurality of demodulation reference signals is associated with a second demodulation reference signal port that corresponds to the first beam and a second polarization,
a first demodulation reference signal of the second plurality of demodulation reference signals is associated with a third demodulation reference signal port that corresponds to the second beam and the first polarization, and
a second demodulation reference signal of the second plurality of demodulation reference signals is associated with a fourth demodulation reference signal port that corresponds to the second beam and the second polarization.

22. The method of claim 21, further comprising:
estimating, based at least in part on the first demodulation reference signal of the first plurality of demodulation reference signals and the first demodulation reference signal of the second plurality of demodulation reference signals, a first polarized component of a channel between the wireless device and a second wireless device; and
estimating, based at least in part on the second demodulation reference signal of the first plurality of demodulation reference signals and the second demodulation reference signal of the second plurality of demodulation reference signals, a second polarized component of the channel.

23. The method of claim 18, further comprising:
receiving a multiple-input, multiple-output signal based at least in part on receiving the first representations of the first symbol, the first representations of the second symbol, the second representations of the first symbol, and the second representations of the second symbol;
combining a plurality of instances of the first symbol received in the multiple-input, multiple-output signal to obtain a diversity-combined first symbol; and
combining a plurality of instances of the second symbol received in the multiple-input, multiple-output signal to obtain a diversity-combined second symbol.

24. A method for wireless communications at a wireless device, comprising:
transmitting, via a first beam, first representations of a first symbol of a space-frequency block coded symbol pair using first resources of a plurality of resources and first representations of a second symbol of the space-frequency block coded symbol pair using second resources of the plurality of resources, wherein the plurality of resources are a plurality of time and frequency resources; and
transmitting, via a second beam, second representations of the first symbol using the second resources and second representations of the second symbol using the first resources of the plurality of resources,
wherein across the plurality of resources, the first beam, and the second beam, each representation of the first symbol and each representation of the second symbol is precoded by a different respective precoder of a plurality of precoders.

25. The method of claim 24, further comprising:
signaling, to a second wireless device, an indication of a correspondence between each precoder of the plurality of precoders and each resource of the plurality of resources.

26. The method of claim 24, further comprising:
mapping the first representations of the first symbol to the first resources and the second representations of the first symbol to the second resources;
applying, based at least in part on the mapping, a first set of precoders of the plurality of precoders to the first resources, wherein the first set of precoders are used for transmissions via the first beam, and wherein respective phases of the first set of precoders are offset from one another; and
applying, based at least in part on the mapping, a second set of precoders of the plurality of precoders to the second resources, wherein the second set of precoders are used for transmissions via the second beam, and wherein respective phases of the second set of precoders are offset from one another.

27. The method of claim 26, further comprising:
cycling a phase of a first precoder to obtain a first plurality of cycled precoders, wherein the first set of precoders comprises the first plurality of cycled precoders; and
cycling a phase of a second precoder to obtain a second plurality of cycled precoders, wherein the second set of precoders comprises the second plurality of cycled precoders.

28. The method of claim 24, further comprising:
transmitting, via the first beam, a first plurality of demodulation reference signals using a second plurality of resources, wherein a bandwidth of the second plurality of resources is larger than a bandwidth of the plurality of resources; and
transmitting, via the second beam, a second plurality of demodulation reference signals using a third plurality of resources, wherein a bandwidth of the third plurality of resources is larger than the bandwidth of the plurality of resources.

29. The method of claim 28, wherein:
a first demodulation reference signal of the first plurality of demodulation reference signals is transmitted via a first demodulation reference signal port that corresponds to the first beam and a first polarization,
a second demodulation reference signal of the first plurality of demodulation reference signals is transmitted via a second demodulation reference signal port that corresponds to the first beam and a second polarization, a first demodulation reference signal of the second plurality of demodulation reference signals is transmitted via a third demodulation reference signal port that corresponds to the second beam and the first polarization, and a second demodulation reference signal of the second plurality of demodulation reference signals is transmitted via a fourth demodulation reference signal port that corresponds to the second beam and the second polarization.

30. The method of claim 29, wherein:

the first demodulation reference signal of the first plurality of demodulation reference signals and the first demodulation reference signal of the second plurality of demodulation reference signals are associated with an estimate of a first polarized component of a channel between the wireless device and a second wireless device, and the second demodulation reference signal of the first plurality of demodulation reference signals and the second demodulation reference signal of the second plurality of demodulation reference signals are associated with an estimate of a second polarized component of the channel.

* * * * *